(12) United States Patent
Kameyama

(10) Patent No.: US 8,421,885 B2
(45) Date of Patent: Apr. 16, 2013

(54) IMAGE PROCESSING SYSTEM, IMAGE PROCESSING METHOD, AND COMPUTER READABLE MEDIUM

(75) Inventor: Hirokazu Kameyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 264 days.

(21) Appl. No.: 12/762,616

(22) Filed: Apr. 19, 2010

(65) Prior Publication Data

US 2010/0265354 A1    Oct. 21, 2010

(30) Foreign Application Priority Data

Apr. 20, 2009  (JP) ................. 2009-102438

(51) Int. Cl.
*H04N 5/76* (2006.01)
*H04N 9/80* (2006.01)

(52) U.S. Cl.
USPC ..................................... 348/231.6; 386/242

(58) Field of Classification Search ............... 348/231.6; 386/242
See application file for complete search history.

(56) References Cited

U.S. PATENT DOCUMENTS

| | | | |
|---|---|---|---|
| 7,120,880 B1* | 10/2006 | Dryer et al. ................... 715/863 |
| 7,705,887 B2* | 4/2010 | Tsubaki ..................... 348/211.4 |
| 2004/0151396 A1* | 8/2004 | Nomura et al. ............... 382/254 |
| 2006/0146146 A1* | 7/2006 | Asada ........................ 348/231.4 |
| 2007/0195174 A1* | 8/2007 | Oren ........................... 348/222.1 |
| 2008/0151073 A1* | 6/2008 | Ryuto ......................... 348/231.6 |
| 2008/0174677 A1* | 7/2008 | Nakajima et al. ........... 348/231.6 |
| 2009/0115864 A1* | 5/2009 | Ogawa ....................... 348/222.1 |
| 2009/0167895 A1* | 7/2009 | Hoshuyama et al. ...... 348/231.6 |
| 2009/0256926 A1* | 10/2009 | Okada et al. ............... 348/222.1 |

* cited by examiner

*Primary Examiner* — Daniel M Pasiewicz
*Assistant Examiner* — Christopher K Peterson
(74) *Attorney, Agent, or Firm* — Birch, Stewart, Kolasch & Birch, LLP.

(57) ABSTRACT

Provided is an image processing apparatus including a parameter storage that stores, in association with a plurality of attributes, a plurality of image processing parameters for respectively rendering subject images of different attributes from each other, into high image quality; and an image generating section that generates a high quality image of a subject image included in an input image, using the plurality of image processing parameters stored in the parameter storage. The image generating section may select at least one image from high quality images of the subject image included in the input image using respectively different combinations of the plurality of image processing parameters, based on comparison with the input image, and generate the selected image as the high quality image.

28 Claims, 15 Drawing Sheets

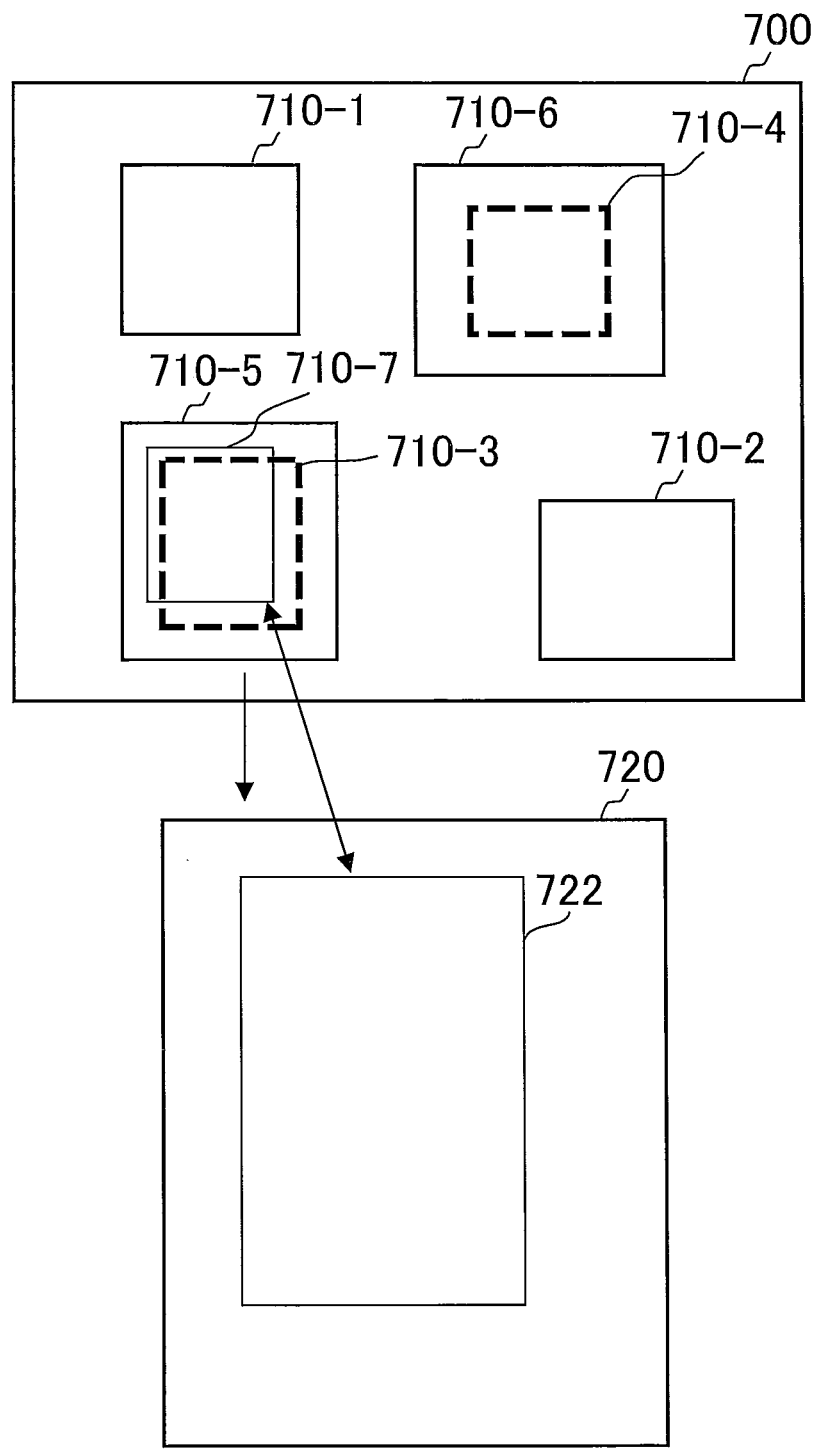
F I G . 7

130

| ORIENTATION | IMAGE PROCESSING PARAMETER |
|---|---|
| 0° | OBJECT-SPECIFIC PARAMETER A0 |
| 20° | OBJECT-SPECIFIC PARAMETER A1 |
| ⋮ | ⋮ |

| FOR NON-HUMAN OBJECT | GENERAL PARAMETER B |
|---|---|

FIG. 11

IMAGE PROCESSING SYSTEM, IMAGE PROCESSING METHOD, AND COMPUTER READABLE MEDIUM

CROSS REFERENCE TO RELATED APPLICATION

The contents of the following patent application are incorporated herein by reference, Japanese Patent Applications No. 2009-102438 filed on Apr. 20, 2009.

BACKGROUND

1. Technical Field

The present invention relates to an image processing apparatus, an image processing method, and a computer readable medium.

2. Description of the Related Art

There is already known an image processing method for identifying a pupil region from a low resolution image generated by rendering a high resolution image in low resolution, detecting a pupil region from an image region on the high resolution image corresponding to the pupil region, and performing red eye correction on the detected region (for example, see Japanese Patent Application Publication No. 2005-149217). Also a video input apparatus for recognizing a character in an image captured by a camera is known (for example, see Japanese Patent Application Publication No. 9-83789). The video input apparatus performs image capturing by gradually raising the resolution of the region of characters by displacing pixels until character recognition becomes finally possible, and character recognition is attempted on the characteristic region having the raised resolution.

Such technologies have faced a challenge that subject images having different attributes (different orientations) from each other cannot be rendered in a high image quality with high accuracy unless with certain high image quality processing suitable for the attribute of the particular subject image.

SUMMARY

Therefore, it is an object of an aspect of the innovations herein to provide an image processing apparatus, an image processing method, and a computer readable medium, which are capable of overcoming the above drawbacks accompanying the related art. The above and other objects can be achieved by combinations described in the independent claims. The dependent claims define further advantageous and exemplary combinations of the innovations herein.

According to a first aspect of the innovations herein, provided is An image processing apparatus including: a parameter storage that stores, in association with a plurality of attributes, a plurality of image processing parameters for respectively rendering subject images of different attributes from each other, into high image quality; and an image generating section that generates a high quality image of a subject image included in an input image, using the plurality of image processing parameters stored in the parameter storage.

The image generating section may select at least one image from high quality images of the subject image included in the input image using respectively different combinations of the plurality of image processing parameters, based on comparison with the input image, and generates the selected image as the high quality image.

The image processing apparatus may further include: an attribute identifying section that identifies an attribute of the subject image included in the input image; and a parameter selecting section that selects image processing parameters from the parameter storage, starting from those associated with attributes that more match the attribute identified by the attribute identifying section, where the image generating section generates a high quality image of the subject image included in the input image, using the image processing parameters selected by the parameter selecting section.

The image processing apparatus may further include: a weight determining section that determines weights to the plurality of image processing parameters used in rendering the subject image included in the input image into high image quality, where the image generating section generates a high quality image of the input image, using the image processing parameters selected by the parameter selecting section, based on the weights determined by the weight determining section.

The weight determining section may determine, to be larger, a weight for an image processing parameter associated with an attribute whose matching level with respect to the identified attribute is larger.

Each of the plurality of attributes may represent a state of a subject.

Each of the plurality of attributes may represent an orientation of a subject.

Each of the plurality of attributes may represent a facial orientation of a person.

Each of the plurality of attributes may represent a facial expression of a person.

Each of the plurality of attributes may represent a gesture of a person.

Each of the plurality of attributes may represent a posture of a person.

Each of the plurality of attributes may represent clothing of a person.

Each of the plurality of attributes may represent a type of a subject.

Each of the plurality of attributes may represent sex of a person.

Each of the plurality of attributes may represent age of a person.

Each of the plurality of attributes may represent race of a person.

The parameter storage may store, as the plurality of image processing parameters for respectively rendering subject images of different attributes from each other, into high image quality, at least one of a plurality of image processing parameters for rendering the subject images into high resolution, a plurality of image processing parameters for increasing a number of tones of a pixel value of the subject images, a plurality of image processing parameters for increasing a number of colors of a pixel value of the subject images, a plurality of image processing parameters for reducing noise of the subject images, a plurality of image processing parameters for reducing artifact of the subject images, a plurality of image processing parameters for reducing blurring of the subject images, and a plurality of image processing parameters for performing sharpness processing on the subject images.

The parameter storage may store the plurality of image processing parameters for rendering subject images included in a moving image in high frame rate.

The image processing apparatus may further include: a parameter generating section that generates a combination parameter being a combination among the plurality of image processing parameters selected by the parameter selecting section, where the image generating section generates the high quality image of the subject image included in the input image, using the combination parameter generated by the parameter generating section.

The image processing apparatus may further include: an external information obtaining section that obtains, from outside, the plurality of image processing parameters stored in the parameter storage, where the parameter storage stores the plurality of image processing parameters obtained by the external information obtaining section.

The summary of the invention does not necessarily describe all necessary features of the present invention. The present invention may also be a sub-combination of the features described above.

BRIEF DESCRIPTION OF THE DRAWINGS

FIG. 7 shows an example of identifying processing of a characteristic region, performed by the characteristic region identifying section 203.

FIG. 11 shows an example of parameters stored in a parameter storage 1010 shown in table format.

DESCRIPTION OF EXEMPLARY EMBODIMENTS

The invention will now be described based on the preferred embodiments, which do not intend to limit the scope of the present invention, but exemplify the invention. All of the features and the combinations thereof described in the embodiment are not necessarily essential to the invention.

Figure 1:
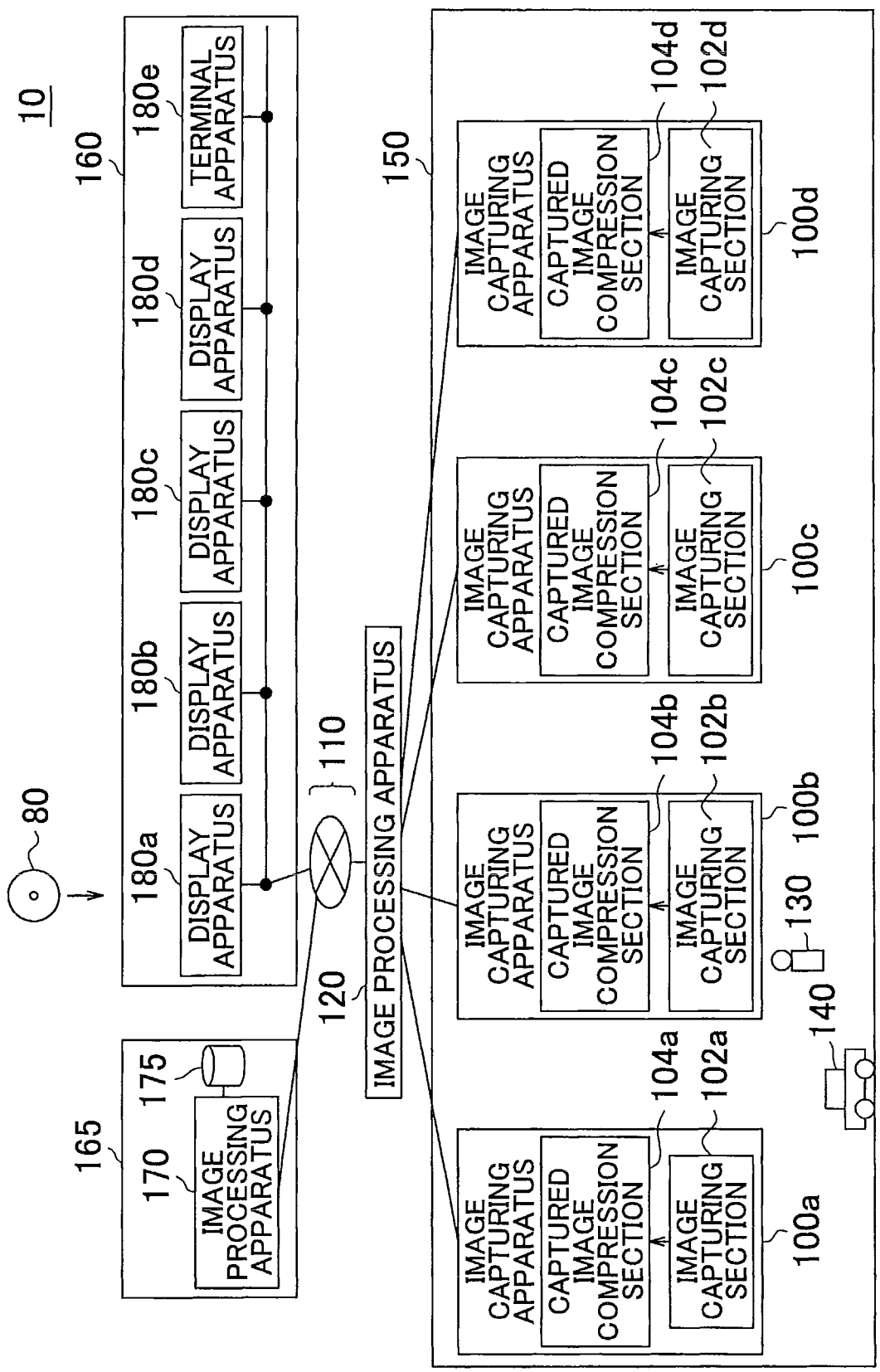
FIG. 1 shows an example of an image processing system 10 according to an embodiment.

FIG. 1 shows an example of an image processing system 10 according to an embodiment. As explained below, the image processing system 10 can function as a monitoring system, for example.

The image processing system 10 includes a plurality of image capturing apparatuses 100a-d for capturing an image of a monitored space 150, an image processing apparatus 120 for processing the image captured by the image capturing apparatus 100, a communication network 110, an image processing apparatus 170, an image DB 175, and a plurality of display apparatuses 180a-d. The image processing apparatus 170 is provided in a space 165 different from the monitored space 150. The display apparatus 180 is provided in a space 160 different from the monitored space 150 or the space 165.

In the following explanation, the image capturing apparatus 100a and the image capturing apparatus 100b are occasionally collectively referred to as "image capturing apparatus 100." In addition, the display apparatuses 180a-d are occasionally collectively referred to as "display apparatus 180." Likewise, in the following explanation, the alphabet and so on at the end of a reference symbol is occasionally omitted, so that the number constituting the reference symbol collectively indicates the element or member.

The image capturing apparatus 100a includes an image capturing section 102a and a captured image compression section 104a. The image capturing apparatus 102a captures a plurality of images by continuously capturing images of the monitored space 150. Note that the images captured by the image capturing section 102a may be in a RAW format. The captured image compression section 104a synchronizes the captured images in the RAW format captured by the image capturing section 102a, and compresses, by means of MPEG encoding or the like, the moving image containing the plurality of captured images obtained by the synchronization, to generate moving image data. In this way, the image capturing apparatus 100a generates moving image data by encoding moving images obtained by capturing the images of the monitored space 150. The image capturing apparatus 100a outputs the moving image data to the image processing apparatus 120.

Note that because the image capturing apparatus 100b, the image capturing apparatus 100c, and the image capturing apparatus 100d have the same configuration as the image capturing apparatus 100a, and the explanation of each constituting element of the image capturing apparatus 100b, the image capturing apparatus 100c, the image capturing apparatus 100d is not given below. In the above-stated manner, the image processing apparatus 120 obtains moving image data generated by each of the image capturing apparatuses 100, from each of the image capturing apparatuses 100.

The image processing apparatus 120 obtains a moving image by decoding the moving image data obtained from the image capturing apparatus 100. The image processing apparatus 120 detects a plurality of characteristic regions different from each other in a type of characteristic (e.g. a region containing a person (human being) 130, a region containing a movable object 140 such as a vehicle, and so on), from each of a plurality of captured images included in the obtained moving image. Then, the image processing apparatus 120 compresses the image of each characteristic region in the level corresponding to the type of the characteristic, as well as compressing the images other than the characteristic regions in stronger level than the compression level used in compressing the images of the characteristic regions.

Note that the image processing apparatus 120 generates characteristic region information including information to identify the characteristic region detected from the captured image. The image processing apparatus 120 then sends the compressed moving image data and the characteristic region information attached thereto, to the image processing apparatus 170 via the communication network 110.

The image processing apparatus 170 receives the compressed moving image data associated with the characteristic region information, from the image processing apparatus 120. Then, the image processing apparatus 170 causes the image DB 175 to store the compressed moving image data, in association with the characteristic region information associated with the compressed moving image data. Note that the image DB 175 may store the compressed moving image data in a nonvolatile storage medium such as a hard disk. The image DB 175 stores compressed captured images in the stated manner.

The image processing apparatus 170, in response to a request from the display apparatus 180, reads compressed moving image data and characteristic region information from the image DB 175, generates a moving image for display by expanding the read compressed moving image data using the characteristic region information, and transmits the moving image for display, to the display apparatus 180 via the communication network 110. The display apparatus 180 displays the moving image for display, which has been received from the image processing apparatus 170.

Note that the image processing apparatus 170 may also generate a moving image for display by expanding the compressed moving image data obtained from the image processing apparatus 120, using the characteristic region information, and cause the image DB 175 to store the moving image for display. In this process, the image processing apparatus 170 may cause the image DB 175 to store the moving image for display in association with the characteristic region information. In response to request from the display apparatus 180, the image processing apparatus 170 may read the moving image for display from the image DB 175, and transmit it together with the characteristic region information, to the display apparatus 180.

The display apparatus 180 may also receive the characteristic region information and the compressed moving image data from either the image processing apparatus 170 or the image processing apparatus 120. In decoding and displaying the received compressed moving image data, the display apparatus 180 may temporarily simply enlarge and display the characteristic region in the captured image after decoding. The display apparatus 180 may determine the image quality of each characteristic region according to the processing capacity of the display apparatus 180, and render the image of the characteristic region, in a high image quality of the determined image quality. The display apparatus 180 may display the high quality image of the characteristic region, instead of the image of the characteristic region in the captured image under display by the display apparatus 180.

Note that the characteristic region information may be text data or such text data having undergone such processing as compression and encryption, which includes the position of the characteristic region(s), the size of the characteristic region(s), the number of characteristic regions, and identification information identifying the captured image from which the characteristic region(s) is(are) detected. The image processing apparatus 170 identifies a captured image satisfying a various search conditions, based on the position of the characteristic regions(s), the size of the characteristic region(s), the number of characteristic regions included in the characteristic region information. Then the image processing apparatus 170 decodes the identified captured image, and provides it to the display apparatus 180 for display.

In this way, the image processing system 10 stores information identifying a characteristic region in association with a moving image, and so can quickly search for, or randomly access a group of captured images satisfying a predetermined condition from the moving image. In addition, the image processing system 10 can decode only a group of captured images satisfying a predetermined condition, and so can display a partial moving image satisfying the predetermined condition quickly, in response to a playback instruction.

The storage medium 80 stores therein programs for the image processing apparatus 120, the image processing apparatus 170, and the display apparatus 180. The programs stored in the storage medium 80 are provided to electronic information processing apparatuses (e.g. computer) respectively functioning as the image processing apparatus 120, the image processing apparatus 170, and the display apparatus 180 according to the present embodiment. The CPU included in a computer may operate according to the contents of the program, to control each unit in the computer. The program executed by the CPU causes the computer to function as the image processing apparatus 120, the image processing apparatus 170, the display apparatus 180, or the like, explained with reference to the present drawing or the drawings thereafter.

Examples of the recording medium 80 may include CD-ROM, or an optical recording medium such as DVD or PD, a magneto-optical recording medium such as MO or MD, a magnetic recording medium such as a tape medium or a hard disk apparatus, a semiconductor memory, and a magnetic memory. Moreover, a recording apparatus such as a hard disk or a RAM installed in a server system connected to a dedicated communication network or to the Internet can function as the recording medium 80.

Figure 2:
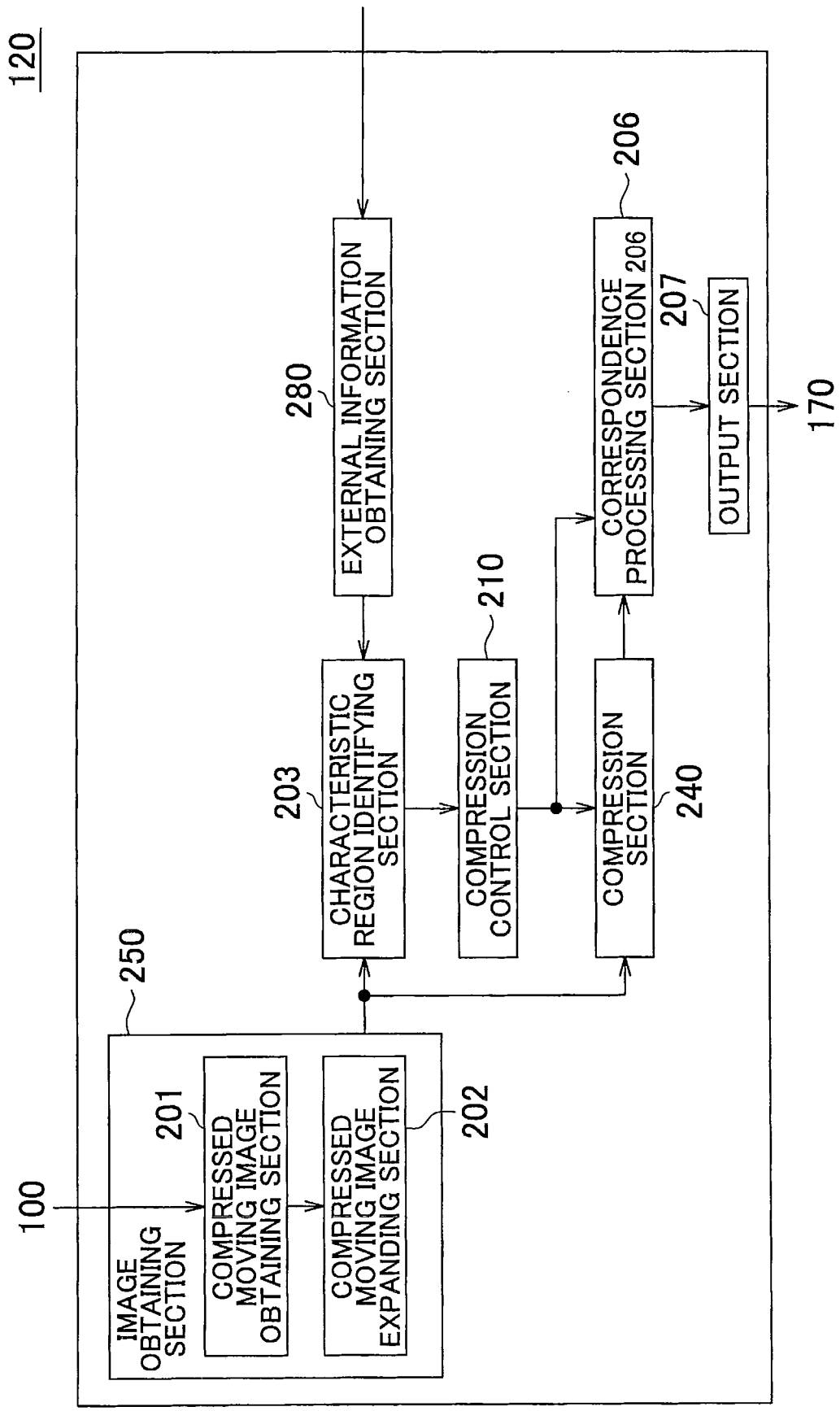
FIG. 2 shows an example of a block configuration of an image processing apparatus 120.

FIG. 2 shows an example of a block configuration of an image processing apparatus 120. The image processing apparatus 120 includes an image obtaining section 250, a characteristic region identifying section 203, an external information obtaining section 280, a compression control section 210, a compression section 240, an correspondence processing section 206, and an output section 207. The image obtaining section 250 includes a compressed moving image obtaining section 201 and a compressed moving image expanding section 202.

The compressed moving image obtaining section 201 obtains a compressed moving image. Specifically, the compressed moving image obtaining section 201 obtains encoded moving image data generated by the image capturing apparatus 100. The compressed moving image expanding section 202 expands the moving image data obtained by the compressed moving image obtaining section 201, and generates a plurality of captured images included in the moving image. Specifically, the compressed moving image expanding section 202 decodes the encoded moving image data obtained by the compressed moving image obtaining section 201, and extracts a plurality of captured images included in the moving image. Note that the captured images included in the moving image may be frame images, or field images.

The plurality of captured images obtained by the compressed moving image expanding section 202 are supplied to the characteristic region identifying section 203 and the compression section 240. The characteristic region identifying section 203 detects a characteristic region from the moving image including the plurality of captured images. Specifically, the characteristic region identifying section 203 detects a characteristic region from each of the plurality of captured images.

For example, the characteristic region identifying section 203 detects, as a characteristic region, an image region in the moving image whose image contents changes. Specifically, the characteristic region identifying section 203 may detect, as a characteristic region, an image region containing a moving object. Note that the characteristic region identifying section 203 may detect a plurality of characteristic regions of different types of characteristics from each other, from each of the plurality of captured images. Note that the type of characteristic may be a type classified using the type of objects as an index (e.g. a human being (person), a mobile object, etc.). The type of objects may be determined based on the matching level in terms of form or color of the object. In this way, the characteristic region identifying section 203 may detect, from a plurality of captured images, a plurality characteristic regions containing different types of objects from each other.

For example, the characteristic region identifying section 203 may extract the object that matches a predetermined form pattern at least at a predetermined matching level from each of the plurality of captured images, and detect regions in the captured images containing the extracted object, as characteristic regions sharing the same type of characteristics. Note that a plurality of form patterns may be determined respectively for a plurality of types of characteristics. An example of the form pattern is a form pattern of a face of a person. A plurality of different face patterns may be determined respectively for a plurality of persons. By doing so, the characteristic region identifying section 203 can detect regions respectively containing different persons, as different characteristic regions from each other.

Note that the characteristic region identifying section 203 may detect, as a characteristic region, a region containing a part of a human body such as a head or a hand, or at least a part of a living body other than a human body, besides a face of a person mentioned above. Note that the expression "a living body" includes a particular tissue inside the living body (e.g., a blood vessel inside the living body). When the image processing system 10 is an endoscope system for example that processes images inside a living body, an example of the particular tissue inside a living body is a cell group including a tumor tissue, biopolymer such as protein, DNA, and RNA, and small molecules inside the living body. Besides the living body stated above, the characteristic region identifying section 203 may detect, as a characteristic region, a region containing a compound such as medicine, protein, money, a card such as a cash card, a vehicle, or a car registration plate of a vehicle. In addition, the characteristic region identifying section 203 may detect the text, the drawing, the table, or the photograph scanned by scanner appliances such as copiers, as a characteristic region. In addition to the stated objects, the characteristic region identifying section 203 may also detect, as a characteristic region, a group of regions having a statistical bias as image information (e.g. texture). In this way, the characteristic region identifying section 203 may detect a variety of targets, as a characteristic region.

In addition to the pattern matching using a template matching, the characteristic region identifying section 203 may also perform a characteristic region detection based on the learning result such as by machine learning (e.g. AdaBoost) described in Japanese Patent Application Publication No. 2007-188419. For example, the characteristic region identifying section 203 uses the image feature value extracted from the image of a predetermined subject and the image feature value extracted from the image of a subject other than the predetermined subject, to learn about the characteristic in the image feature value extracted from the image of the predetermined subject. Then, the characteristic region identifying section 203 may detect, as a characteristic region, a region from which the image feature value corresponding to the characteristic matching the learned characteristic is extracted.

The characteristic region identifying section 203 may detect a characteristic region using a method described in Japanese Patent Application No. 2008-078641. For example, in an attempt to extract an object, the characteristic region identifying section 203 thins captured images at a single or a plurality of predetermined rate(s), to generate a group of images including the captured images and one or more thinned images. The characteristic region identifying section 203 calculates an evaluation value by adopting a first filter on a first image that is relatively small compared to the other images in the generated group of images. The first filter acts on a two-dimensional region on the image, to generate the evaluation value representing a probability that a predetermined type of object exists within the region. The first filter may be a filter for use in a relatively small region, from among a group of filters for use in a plurality of regions respectively having a different area size from each other, where the area sizes correspond to the number of pixels at a single or a plurality of predetermined rate(s), the number of pixels corresponds to the area size of the region on the image. Examples of the plurality of regions respectively having a different area size from each other may include a region of 32*32 pixels, a region of 16*16 pixels, and a region of 8*8 pixels. The characteristic region identifying section 203 extracts, from the first image, a primary candidate region from which the evaluation value exceeding a predetermined first threshold value has been obtained.

Then, the characteristic region identifying section 203 selects, from the group of filters, a second filter for use in a region that is wider than the first filter by one level, and uses the selected second filter on the region, corresponding to the primary candidate region, of the second image having a larger number of pixels than the first image by one level, to calculate an evaluation value. Then, the characteristic region identifying section 203 extracts a secondary candidate region from which the evaluation value exceeding a predetermined second threshold value is obtained.

Here, the characteristic region identifying section 203 repeats an extraction process for extracting the above-mentioned candidate regions by adopting the above-mentioned plurality of filters which respectively have a different area size from each other, on the region of the corresponding area size in the group of images. In pursuing the above operation, the characteristic region identifying section 203 repeats the extraction process, by sequentially adopting a filter for use in a relatively small region and a filter for use in a relatively large region. Specifically, the characteristic region identifying section 203 repeats the extraction process, starting from adopting a filter for use in a relatively small region, with respect to a relatively small image, and then adopting a filter for use in a relatively large region, with respect to a relatively large image sequentially. Then, the characteristic region identifying section 203 detects a predetermined type of object, by performing at least one cycle of repetition of the extraction process and eventually extracting the candidate region. Then, the characteristic region identifying section 203 detects, as a characteristic region, a region containing the predetermined type of object. In this way, the characteristic region identifying section 203 limits usage of a filter, to the region extracted in the immediate preceding repetition cycle of the extraction process. Therefore, determination of the existence of the object is sequentially performed in each of the repetition cycles of the extraction process, allowing the detection of the characteristic region with accuracy. In addition, a characteristic region can be roughly detected using small-size images, which helps detect a characteristic region in short time.

The characteristic region identifying section 203 may also detect a characteristic region using a method described in Japanese Patent Application No. 2008-078636. For example, the characteristic region identifying section 203 detects a characteristic region using a plurality of filters for use in a region of a captured image having a predetermined area size extending two dimensionally, and for calculating the feature value of the outline or the feature value of the inside of the outline of the object of a predetermined type. Specifically, the characteristic region identifying section 203 adopts the plurality of filters on regions having a predetermined area size on the captured image, in an attempt to detect an object therefrom. Here, the plurality of filters are assigned correspondence relation between each feature value calculated by each of the plurality of filters and a primary evaluation value representing a probability of being the object of the predetermined type. The characteristic region identifying section 203 refers to the correspondence relation to obtain respective primary evaluation values associated with calculated feature values. The characteristic region identifying section 203 sums the primary evaluation values of the plurality of filters, to obtain a secondary evaluation value representing a probability that the object of the predetermined type exists in the region. For example, the characteristic region identifying section 203 obtains the secondary evaluation value by augmenting each primary evaluation value at a predetermined weight. The characteristic region identifying section 203 compares the secondary evaluation value with the threshold value, and extracts a region whose probability of including the object of the predetermined type exceeds the threshold value. The filters may include a filter for obtaining a difference in x direction for the pixel value of a predetermined position, a filter for obtaining a difference in y direction for the pixel value of a predetermined position, and a filter for detecting the edge of a curve by a subtraction operation performed on the pixel value of a predetermined position. According to the above configuration, the characteristic region identifying section 203 detects the region as the characteristic region containing the object of the predetermined type. In this way, the characteristic region identifying section 203 can extract a characteristic region with high accuracy compared to the extraction only by means of the form of the outline, for example, by combining a plurality of filters for extracting the features values of various characteristics of the outline and the inside the outline of the object.

In addition, the characteristic region identifying section 203 may detect a characteristic region, by a combination of the method described in Japanese Patent Application No. 2008-078636 and the method described in Japanese Patent Application No. 2008-078641. Specifically, the above-described plurality of filters with reference to the method described in Japanese Patent Application No. 2008-078636 may be included for each region of a different area size from each other, where the area sizes correspond to the number of pixels at a single or a plurality of predetermined rate(s), the number of pixels corresponds to the area size of the region on the image. In this case, each of the plurality of filters may be assigned the above-described correspondence relation. In an attempt to detect an object, the characteristic region identifying section 203 thins captured images at a single or a plurality of predetermined rate(s), to generate a group of images including the captured images and one or more thinned images. The characteristic region identifying section 203 calculates a plurality of feature values by adopting a plurality of first filters for use in a relatively small region, for a first image that is relatively small compared to the other images in the group of images. Then, the characteristic region identifying section 203 calculates each primary evaluation value of a respective one of the calculated feature values, based on the correspondence relation of each of the plurality of first filters. The characteristic region identifying section 203 sums the primary evaluation values, to obtain a secondary evaluation value representing a probability that the object of the predetermined type exists in the region. Then the characteristic region identifying section 203 compares the obtained secondary evaluation value with a first threshold value, and extracts a primary candidate region whose probability of including the object of the predetermined type exceeds the first threshold value.

In addition, the characteristic region identifying section 203 calculates the plurality of feature values by adopting a plurality of second filters for use in a region that is wider than the plurality of first filters by one level, on the region, corresponding to the primary candidate region, of the second image having a larger number of pixels than the first image from among the group of images to calculate a plurality of feature values. Then, the characteristic region identifying section 203 obtains each primary evaluation value of a respective one of the calculated feature values, based on the correspondence relation of each of the plurality of second filters. The characteristic region identifying section 203 sums the primary evaluation values of the plurality of second filters, to obtain a secondary evaluation value representing a probability that the object of the predetermined type exists in the region corresponding to the primary candidate region. Then the characteristic region identifying section 203 compares the obtained secondary evaluation value with a second threshold value, and extracts a secondary candidate region whose probability of including the object of the predetermined type exceeds the second threshold value.

Here, the characteristic region identifying section 203 repeats an extraction process for extracting the above-mentioned candidate regions by adopting the above-mentioned plurality of filters which respectively have a different area size from each other, on the region of the corresponding area size in the group of images. In pursuing the above operation, the characteristic region identifying section 203 repeats the extraction process, by sequentially adopting a filter for use in a relatively small region and a filter for use in a relatively large region. Specifically, the characteristic region identifying section 203 repeats the extraction process, starting from adopting a filter for use in a relatively small region, with respect to a relatively small image, and then adopting a filter for use in a relatively large region, with respect to a relatively large image sequentially. Then, the characteristic region identifying section 203 detects a predetermined type of object, by performing at least one cycle of repetition of the extraction process and eventually extracting the candidate region. Then, the characteristic region identifying section 203 detects, as a characteristic region, a region containing the predetermined type of object.

In addition, the characteristic region identifying section 203 may detect a characteristic region using a method described in Japanese Patent Application No. 2008-098600. For example, the characteristic region identifying section 203 detects a characteristic region from a plurality of captured images included in the moving image captured by a plurality of image capturing apparatuses 100. For example, the image capturing apparatus 100*a* and the image capturing apparatus 100*b* are capturing the image of the same scene as each other. For example, the image capturing apparatus 100*a* and the image capturing apparatus 100*b* may function as a stereo camera. In addition, the first captured image captured by the image capturing apparatus 100*a* and the second captured image captured by the image capturing apparatus 100*b* are referred to as a pair of images. The characteristic region identifying section 203 may detect the object of the predetermined type contained in the pair of images, and detect a region corresponding to the object of the predetermined type as a characteristic region.

The characteristic region identifying section 203 extracts the region containing object of the predetermined type, from each of the pair of first and second captured images. Here, the characteristic region identifying section 203 may detect the region containing the object of the predetermined type, at rough detection accuracy. For example, the characteristic region identifying section 203 may extract the size of the object included in each captured image, and detect the region containing an object of substantially the same size, as the region containing the object of the predetermined type. Then, the characteristic region identifying section 203 detects a pair of regions corresponding to each other, from the regions of the first captured image and the regions of the second captured image, to detect the object of the predetermined type. For example, the characteristic region identifying section 203 calculates the distance up to a subject contained in the region, from the images of the pair of regions. For example, the characteristic region identifying section 203 can calculate this distance, from the difference in positions of the same subject on the images. The characteristic region identifying section 203 can detect the object of the predetermined type, based on the three dimensional form of the subject obtained according to the distance up to the subject.

Here, the characteristic region identifying section 203, when detecting the pair of regions, divides the region containing the object of the predetermined type detected from the first and second captured images detected as a pair of images, into a plurality of subregions. The characteristic region identifying section 203 calculates a vector of the feature value characterizing a partial image contained in each subregion, the vector encompassing the plurality of subregions. Here, the feature value includes a pixel value. In addition, an example of the vector encompassing the plurality of subregions is a gradient vector (e.g., pixel value gradient vector). The characteristic region identifying section 203 calculates the logical distance between the calculated vector of the region on the first image and the vector on the second image. The characteristic region identifying section 203 detects, as a pair of regions corresponding to each other, a pair of regions between which the logical distance is smaller than a predetermined value. Note that an example of the logical distance is the square root of the square sum of the difference between each component constituting a vector. In this way, the characteristic region identifying section 203 can extract the pair of corresponding regions from the pair of images with high accuracy, and so can calculate the distance up to the subject with high accuracy. Therefore, the characteristic region identifying section 203 can recognize the three dimensional form of a subject with high accuracy, and can so detect the object of the predetermined type with higher accuracy.

Moreover, the characteristic region identifying section 203 may detect a characteristic region using a method described in Japanese Patent Application No. 2008-091562. For example, the characteristic region identifying section 203 extracts a subject-similar form similar to a subject of a predetermined type, from each of a plurality of images included in a moving image, together with the size of the subject-similar form and the positional information in the image angle of the image capturing apparatus 100. For example, when detecting the head of a person, the characteristic region identifying section 203 extracts the subject-similar form whose upper half outline is substantially semicircular, together with its size and the positional information in the image angle. An example of the positional information in the image angle is a position on the image region of a captured image. The characteristic region identifying section 203 extracts the subject of the predetermined type, after determining whether the subject of the extracted subject-similar form is the subject of the predetermined type. For example, the characteristic region identifying section 203 may count the number of subjects in the subject-similar form classified as having the same size, which have been detected from a predetermined search region surrounding the subject of the subject-similar form, and extract the subject of the subject-similar form as the subject of the predetermined type, if the counted value is no smaller than a threshold value. The characteristic region identifying section 203 may detect, as a characteristic region, a region containing the subject of the predetermined type. Consequently, the characteristic region identifying section 203 can detect the subject of the subject-similar form within the image region from which the subjects of a size similar to a predetermined size have been intensively detected, as the subject of the predetermined type. This does not require detection of the subject of the subject-similar form from other regions except for the image region as the subject of the predetermined type. As a result, it is possible to decrease the probability of mistakenly detecting, as the subject of the predetermined type, the subject of the subject-similar form in any region other than the image region.

When the image capturing apparatus 100 can capture an image while varying its image angle, the positional information in the image angle mentioned above may be an image capturing direction of the image capturing apparatus 100 and the position on the captured image, for example. In addition, when the plurality of image capturing apparatuses 100 can be used to capture a continuous field wider than the field captured by a single image capturing apparatus 100, the positional information in the image angle mentioned above may be the image capturing directions of the plurality of image capturing apparatuses 100, and the position on the captured images captured by the plurality of image capturing apparatuses 100.

The characteristic region identifying section 203 can detect the region containing a predetermined subject, as a characteristic region. Note that the characteristic region detected by the characteristic region identifying section 203 may have an arbitrary form (e.g., a rectangular form).

As stated above, the characteristic region identifying section 203 detects a plurality of characteristic regions from a plurality of captured images included in a plurality of moving images. The characteristic region identifying section 203 then supplies the information representing the detected characteristic regions, to the compression control section 210. Note that the information representing the characteristic regions includes coordinates information identifying the position of the characteristic regions, type information identifying the type of the characteristic regions, and information identifying the moving images from which the characteristic regions are detected.

The compression control section 210 controls the compression processing of the moving image performed by the compression section 240, based on the information identifying the characteristic regions obtained from the characteristic region identifying section 203. According to control by the compression control section 210, the compression section 240 adopts different levels of compression, between the characteristic region and the other region in the captured image, as detailed below. For example, the compression section 240 compresses the captured image, by adopting a lower resolution on the regions other than the characteristic region in the captured image included in the moving image, than the resolution for the characteristic region. In this way, the compression section 240 compresses each of the image regions in the captured image, in a compression level corresponding to the importance level of the image region.

Note that when the characteristic region identifying section 203 has identified a plurality of characteristic regions, the compression section 240 may compress the image of each of the plurality of characteristic regions in the captured image, in the level corresponding to the type of the characteristic of each characteristic region. For example, the compression section 240 may reduce the resolution of the image of each of the plurality of characteristic regions in the captured image, down to the resolution determined according to the type of the characteristic of each characteristic region.

The correspondence processing section 206 associates the information identifying the characteristic region detected from the captured image, with the captured image. Specifically, the correspondence processing section 206 associates the information identifying the characteristic region detected from the captured image, with a compressed moving image containing the captured image as a moving image constituting image. Then, the output section 207 outputs, to the image processing apparatus 170, the compressed moving image data associated with the information identifying the characteristic region by the correspondence processing section 206.

The external information obtaining section 280 obtains, from outside of the image processing apparatus 120, data used by the characteristic region identifying section 203 in processing to identify the characteristic region. The characteristic region identifying section 203 identifies the characteristic region using the data obtained by the external information obtaining section 280. The data obtained by the external information obtaining section 280 is detailed later with reference to FIG. 6.

Figure 3:
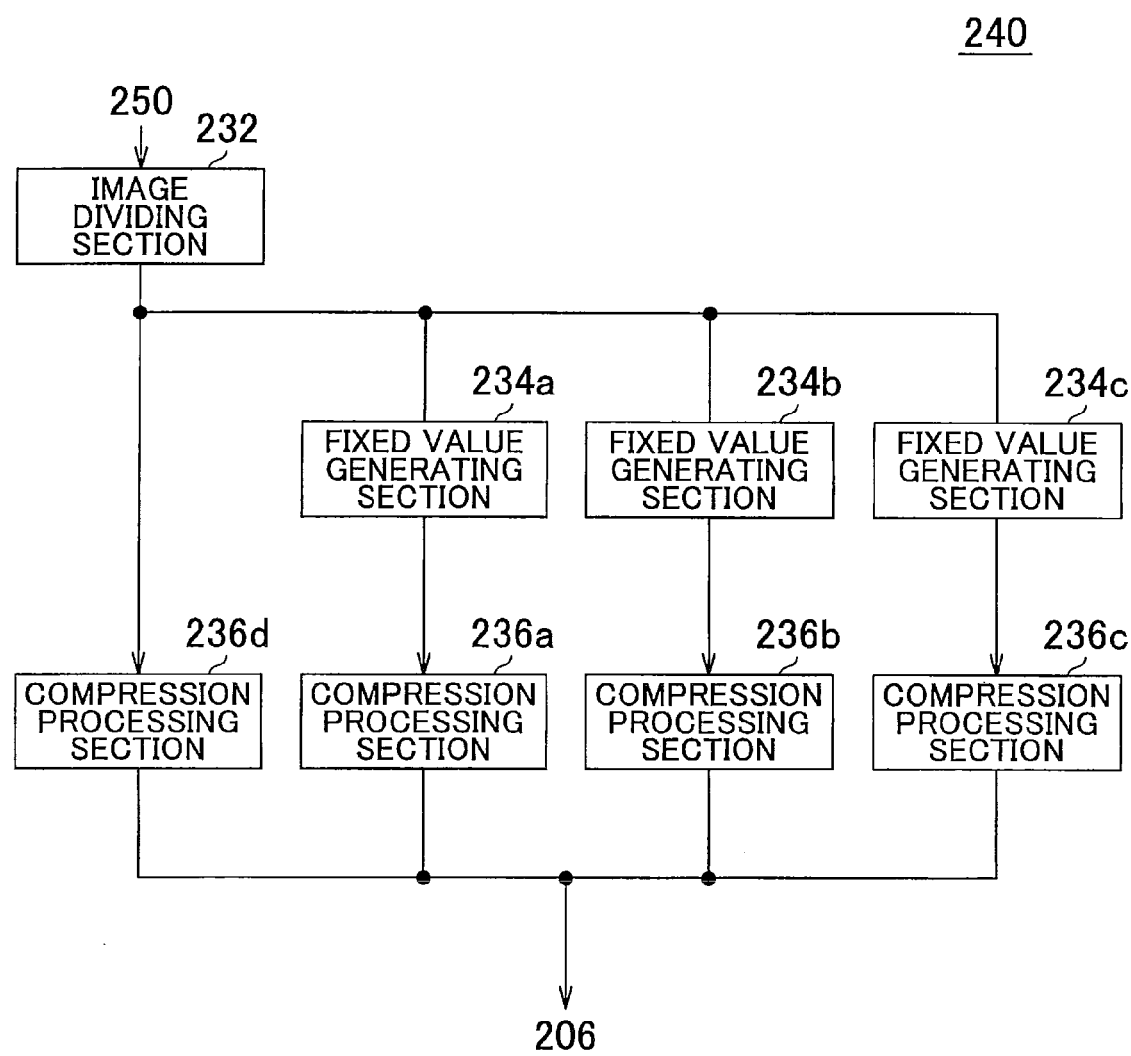
FIG. 3 shows an example of a block configuration of a compression section 240.

FIG. 3 shows an example of a block configuration of a compression section 240. The compression section 240 includes an image dividing section 232, a plurality of fixed value generating sections 234*a-c* (hereinafter, occasionally collectively referred to as "fixed value generating section 234"), and a plurality of compression processing sections 236*a-d* (hereinafter, occasionally collectively referred to as "compression processing section 236").

The image dividing section 232 obtains a plurality of captured images from the image obtaining section 250. The image dividing section 232 divides the plurality of captured images into a characteristic region and a background region other than the characteristic region. The image dividing section 232 may divide the plurality of captured images into a plurality of characteristic regions respectively and a background region other than the plurality of characteristic regions. In this way, the image dividing section 232 divides each of the plurality of captured images into a characteristic region and a background region. Then, the compression processing section 236 compresses the image of a characteristic region (characteristic region image) and the image of a background region (background region image) at different compression levels from each other. Specifically, the compression processing section 236 compresses a characteristic region moving image containing a plurality of characteristic region images and a background region moving image containing a plurality of background region images, at different compression levels from each other.

Specifically, the image dividing section 232 divides the plurality of captured images, to generate a characteristic region image for each type of characteristics. The fixed value generating section 234 generates a fixed value of the pixel value of the region other than the characteristic region of each type of characteristics, for each of the characteristic region images included in the plurality of characteristic region moving images generated for each type of characteristics. Specifically, the fixed value generating section 234 renders the pixel value of the region other than the characteristic region into a predetermined pixel value. Then, the compression processing section 236 compresses the plurality of characteristic region moving images for each type of characteristics. For example, the compression processing section 236 performs MPEG compression on the plurality of characteristic region moving images for each type of characteristics.

The fixed value generating section 234*a*, the fixed value generating section 234*b*, and the fixed value generating section 234*c* respectively generate a fixed value of the characteristic region moving image of the first type of characteristics, a fixed value of the characteristic region moving image of the second type of characteristics, and a fixed value of the characteristic region moving image of the third type of characteristics. Then, the compression processing section 236*a*, the compression processing section 236*b*, and the compression processing section 236*c* compress the characteristic region moving image of the first type of characteristics, the characteristic region moving image of the second type of characteristics, the characteristic region moving image of the third type of characteristics.

Note that the compression processing sections 236*a-c* compress the characteristic region moving image in a compression level predetermined according to the type of characteristics. For example, the compression processing section 236 may convert a characteristic region moving image into a moving image of a different resolution predetermined according to the type of characteristics of the characteristic region, and compress the characteristic region moving image after the conversion. When compressing a characteristic region moving image by the MPEG encoding, the compression processing section 236 may compress the characteristic region moving image using a predetermined quantization parameter for each type of characteristics.

The compression processing section 236*d* compresses a background region moving image. The compression processing section 236*d* may compress a background region moving image in a compression level higher than the compression level adopted by any of the compression processing sections 236*a-c*. The characteristic region moving image and the background region moving image compressed by means of the compression processing section 236 are supplied to the correspondence processing section 206.

Note that a fixed value for the region other than the characteristic region is generated by the fixed value generating section 234, and so when the compression processing section 236 performs a predictive coding (e.g. MPEG encoding), the amount of difference between the actual image and the predicted image in the region other than the characteristic region can be reduced greatly. With this in view, the compression section 240 can compress the characteristic region moving image at a higher compression rate.

With the configuration of this drawing, the plurality of compression processing sections 236 in the compression section 240 are used to compress the images of the plurality of characteristic regions and the image of the background region, separately. However, in another embodiment, the compression section 240 may include a single compression processing section 236, so that the compression processing section 236 compresses the images of the plurality of characteristic regions and the image of the background region, at different compression levels from each other. For example, the images of the plurality of characteristic regions and the image of the background region may be sequentially supplied in a time divisional manner by means of the single compression processing section 236, and the single compression processing section 236 may sequentially compress the images of the plurality of characteristic regions and the image of the background region, at different compression levels from each other.

Alternately, a single compression processing section 236 may compress the images of the plurality of characteristic regions and the image of the background region at different compression levels from each other, by quantizing the image information of the plurality of characteristic regions and the image information of the background region at different quantization factors from each other. The images of different image qualities from each other, resulting from converting the images of the plurality of characteristic regions and the image of the background region, are supplied to the single compression processing section 236, and the single compression processing section 236 may compress each of the images of the plurality of characteristic regions and the image of the background region. In the above-explained embodiment in which a single compression processing section 236 quantizes each region with different quantization factors or in which a single compression processing section 236 compresses an image whose regions are converted to different image qualities from each other, the single compression processing section 236 may compress the entirety of one image, or the images resulting by division of the image dividing section 232. Note that when a single compression processing section 236 compresses the entirety of one image, it becomes unnecessary to perform the dividing processing by the image dividing section 232 or the fixed value generating processing by the fixed value generating section 234, and so the compression section 240 does not have to include the image dividing section 232 and the fixed value generating section 234.

Figure 4:
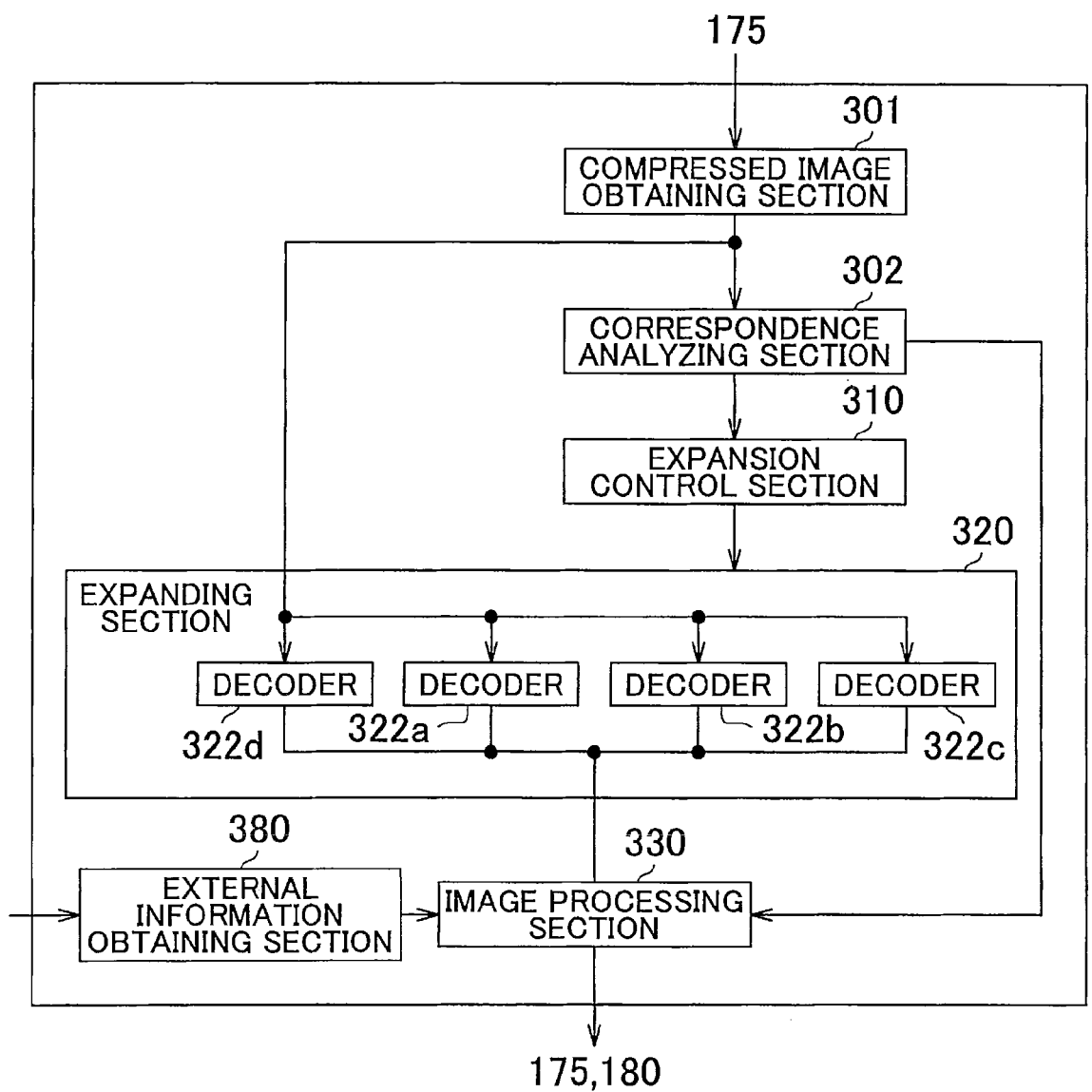
FIG. 4 shows an example of a block configuration of an image processing apparatus 170.

FIG. 4 shows an example of a block configuration of the image processing apparatus 170. The image processing apparatus 170 includes a compressed image obtaining section 301, a correspondence analyzing section 302, an expansion control section 310, an expanding section 320, an eternal information obtaining section 380, and an image processing section 330. The expanding section 320 includes a plurality of decoders 322a-d (hereinafter, occasionally collectively referred to as "decoder 322").

The compressed image obtaining section 301 obtains a compressed moving image, having undergone compression by the image processing apparatus 170. Specifically, the compressed image obtaining section 301 obtains a compressed moving image containing a plurality of characteristic region moving images and a background region moving image. More specifically, the compressed image obtaining section 301 obtains a compressed moving image assigned characteristic region information.

The correspondence analyzing section 302 separates the compressed moving image into a plurality of characteristic region moving images, a background region moving image, and characteristic region information, and supplies the plurality of characteristic region moving images and the background region moving image to the expanding section 320. The correspondence analyzing section 302 also analyses the characteristic region information, and supplies the position of the characteristic region and the type of the characteristic, to the expansion control section 310 and the image processing section 330.

The expansion control section 310 controls the expansion processing of the expanding section 320, according to the position of the characteristic region and the type of the characteristic obtained from the correspondence analyzing section 302. For example, the expansion control section 310 controls the expanding section 320 to expand each region of the moving image represented by the compressed moving image, according to a compression method used by the compression section 240 in compressing each region of the moving image according to the position of the characteristic region and the type of characteristics.

The decoder 322 decodes either the plurality of characteristic region moving images and the background region moving image, which have been encoded. Specifically, the decoder 322a, the decoder 322b, the decoder 322c, and the decoder 322d decode the first characteristic region moving image, the second characteristic region moving image, the third characteristic region moving image, and the background region moving image, respectively.

The image processing section 330 combines the plurality of characteristic region moving images and the background region moving image, having been expanded by the expanding section 320, to generate a single moving image. Specifically, the image processing section 330 generates a single display moving image, by combining the image of the characteristic region on the captured image included in the plurality of characteristic region moving images, with the captured image included in the background region moving image. Note that the image processing section 330 may generate a display moving image in which the characteristic region has a higher image quality than the background region.

The image processing section 330 outputs, to the display apparatus 180 or the image DB 175, the characteristic region information and the display moving image obtained from the correspondence analyzing section 302. Note that the image DB 175 may store, in a nonvolatile recording medium such as a hard disk, the position of the characteristic region(s) shown by the characteristic region information, the type of the characteristic of the characteristic region(s), and the number of characteristic regions, in association with the information identifying the captured image included in the display moving image.

The external information obtaining section 380 obtains data used by the image processing section 330 to perform image processing, from outside of the image processing apparatus 170. The image processing section 330 performs image processing using the data obtained by the external information obtaining section 380. The data obtained by the external information obtaining section 380 is detailed later with reference to FIG. 10.

Figure 5:
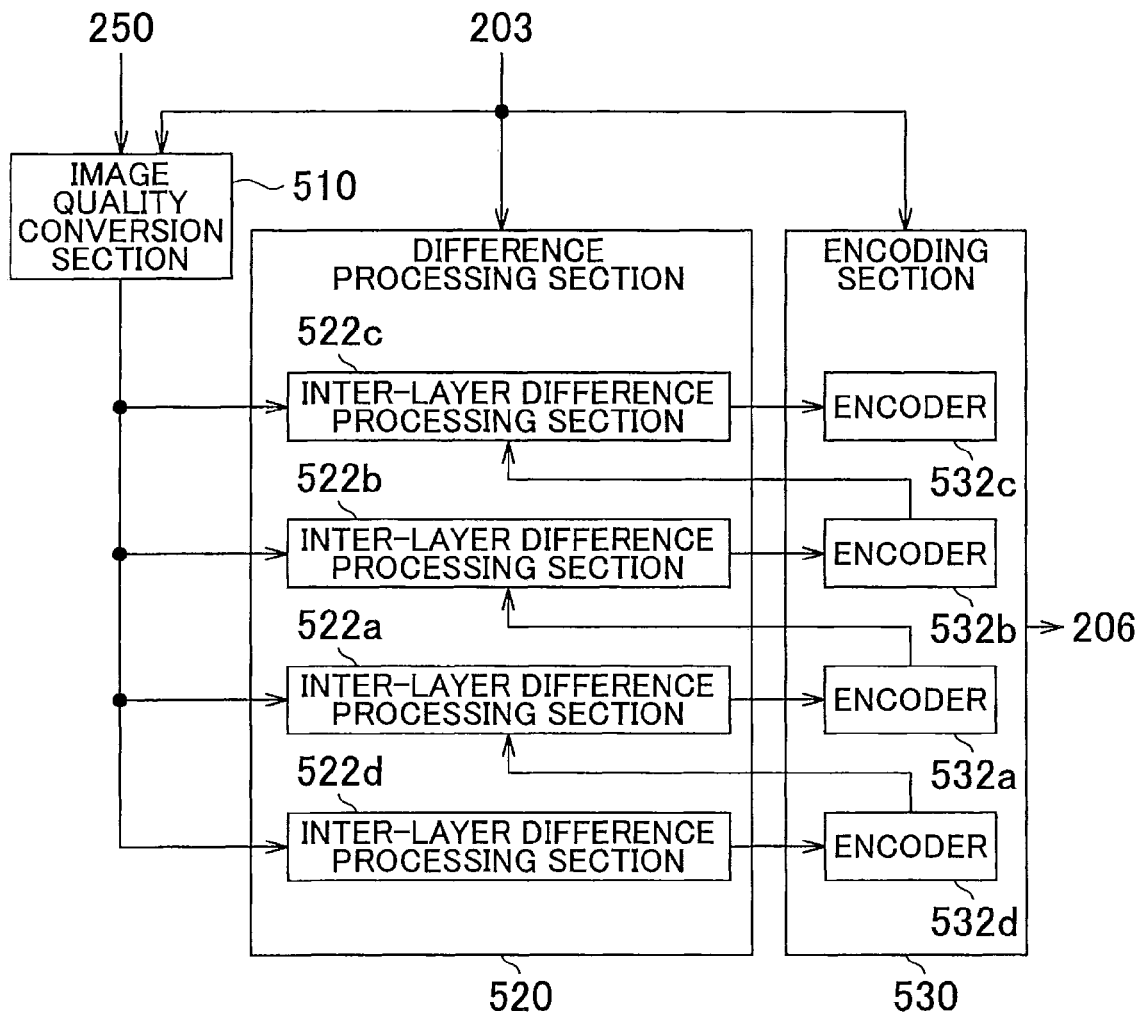
FIG. 5 shows another example of the block configuration of the compression section 240.

FIG. 5 shows another example of the block configuration of the compression section 240. The compression section 240 with the present configuration compresses a plurality of captured images, by means of spatial scalable coding corresponding to the type of characteristics.

The compression section 240 with the present configuration includes an image quality conversion section 510, a difference processing section 520, and an encoding section 530. The difference processing section 520 includes a plurality of inter-layer difference processing sections 522a-d (hereinafter collectively referred to as "inter-layer difference processing section 522"). The encoding section 530 includes a plurality of encoders 532a-d (hereinafter collectively referred to as "encoder 532").

The image quality conversion section 510 obtains a plurality of captured images, from the image obtaining section 250. The image quality conversion section 510 obtains information identifying the characteristic region detected by the characteristic region identifying section 203 and information identifying the type of characteristics of the characteristic region. Then, the image quality conversion section 510 copies the captured image thereby generating the number of captured images corresponding to the number of types of characteristics of the characteristics region. The image quality conversion section 510 converts the generated captured images, into images of resolution respectively corresponding to the types of characters.

For example, the image quality conversion section 510 generates a captured image (hereinafter "low resolution image") converted into a resolution corresponding to the background region, a captured image (hereinafter "first resolution image") converted into a first resolution corresponding to a first type of characteristics, a captured image (hereinafter "second resolution image") converted into a second resolution corresponding to a second type of characteristics, and a captured image (hereinafter "third resolution image") converted into a third resolution corresponding to a third type of characteristics. Here, it is assumed that the first resolution image has a resolution higher than the low resolution image, the second resolution image has a resolution higher than the first resolution image, and the third resolution image has a resolution higher than the second resolution image.

The image quality conversion section 510 supplies the low resolution image, the first resolution image, the second resolution image, and the third resolution image, respectively to the inter-layer difference processing section 522d, the inter-layer difference processing section 522a, the inter-layer difference processing section 522b, and the inter-layer difference processing section 522c. Note that the image quality conversion section 510 converts the above-mentioned image quality conversion processing on each of the plurality of captured images, to supply moving images to the inter-layer difference processing sections 522 respectively.

The image quality conversion section 510 may convert the frame rate of the moving images supplied to the inter-layer difference processing sections 522, according to the type of characteristics of the characteristic region. For example, the image quality conversion section 510 may supply, to the inter-layer difference processing section 522d, the moving image of a frame rate lower than the frame rate of the moving image supplied to the inter-layer difference processing section 522a. In addition, the image quality conversion section 510 may supply, to the inter-layer difference processing section 522a, the moving image of a frame rate lower than the frame rate of the moving image supplied to the inter-layer difference processing section 522b, and may supply, to the inter-layer difference processing section 522b, the moving image of a frame rate lower than the frame rate of the moving image supplied to the inter-layer difference processing section 522c. Note that the image quality conversion section 510 may convert the frame rate of the moving images supplied to the inter-layer difference processing sections 522, by performing thinning processing on the captured image according to the type of characteristics of the characteristic region.

The inter-layer difference processing section 522d and the encoder 532d perform predictive coding on the background region moving image containing a plurality of low resolution images. Specifically, the inter-layer difference processing section 522 generates a differential image with respect to the predictive image generated from another low resolution image. The encoder 532d quantizes the conversion factor obtained by converting the differential image into a spatial frequency component, and encodes the quantized conversion factor using entropy coding or the like. Note that such predictive coding processing may be performed for each partial region of the low resolution image.

The inter-layer difference processing section 522a performs predictive coding processing on the first characteristic region moving image containing a plurality of first resolution images supplied by the image quality conversion section 510. Likewise, the inter-layer difference processing section 522b and the inter-layer difference processing section 522c perform predictive coding processing on the second characteristic region moving image containing a plurality of second resolution images and the third characteristic region moving image containing a plurality of third resolution images. The following explains concrete operations performed by the inter-layer difference processing section 522a and the encoder 532a.

The inter-layer difference processing section 522a decodes the first resolution image after undergoing the encoding by the encoder 532d, and enlarges the decoded image into the first resolution. Then, the inter-layer difference processing section 522a generates a difference image between the enlarged image and the low resolution image. During this process, the inter-layer difference processing section 522a sets the difference value in the background region to 0. The encoder 532a performs, on the difference image, the same encoding performed by the encoder 532d. Note that the encoding processing performed by the inter-layer difference processing section 522a and the encoder 532a may be performed for each partial region of the first resolution image.

When encoding a first resolution image, the inter-layer difference processing section 522a compares the encoding amount predicted when encoding the difference image between the first resolution image and the low resolution image, with the encoding amount predicted when encoding the difference image between the first resolution image and the predicted image generated from another first resolution image. If the latter encoding amount is smaller, the inter-layer difference processing section 522a generates a difference image between the first resolution image and the predicted image generated from another first resolution image. When it is predicted that the encoding amount can be smaller if performing encoding without obtaining the difference with either the low resolution image or the predicted image, the inter-layer difference processing section 522a may not obtain the difference with either the low resolution image or the predicted image.

The inter-layer difference processing section 522a may not set the difference value in the background region to 0. In this case, the encoder 532a may set the data after encoding with respect to the difference information in the region other than the characteristic region to 0. For example, the encoder 532a may set the conversion factor after converted into a frequency component to 0. Note that when the inter-layer difference processing section 522d performs predictive coding processing, the motion vector information is supplied to the inter-layer difference processing section 522a. The inter-layer difference processing section 522a may calculate the motion vector for predicted images, using the motion vector information supplied from the inter-layer difference processing section 522d.

Note that the operations performed by the inter-layer difference processing section 522b and the encoder 532b are the same as the operations performed by the inter-layer difference processing section 522a and the encoder 532a, except in that the inter-layer difference processing section 522b and the encoder 532b encode the second resolution image, and occasionally obtain the difference between the second resolution image and the first resolution image after encoding by the encoder 532a in encoding the second resolution image, therefore the operations of the inter-layer difference processing section 522*b* and the encoder 532*b* are not explained below. Likewise, the operations performed by the inter-layer difference processing section 522*c* and the encoder 532*c* are the same as the operations performed by the inter-layer difference processing section 522*a* and the encoder 532*a*, except in that the inter-layer difference processing section 522*c* and the encoder 532*c* encode the third resolution image, and occasionally obtain the difference between the third resolution image and the second resolution image after encoding by the encoder 532*b* in encoding the third resolution image, therefore the operations of the inter-layer difference processing section 522*c* and the encoder 532*c* are not explained below.

As explained above, the image quality conversion section 510 generates a low quality image and a high image quality characteristic region image in which at least the characteristic region is rendered in higher image quality than the low quality image. The difference processing section 520 generates a characteristic region difference image representing a difference between the image of the characteristic region in the characteristic region image and the image of the characteristic region in the low quality image. The encoding section 530 encodes the characteristic region difference image and the low quality image.

The image quality conversion section 510 generates a low quality image having a resolution lower than the plurality of captured images, and the difference processing section 520 generates the characteristic region difference image, which is a difference between the image of the characteristic region in the characteristic region image and the image resulting from enlarging the image of the characteristic region in the low quality image. In addition, the difference processing section 520 generates a characteristic region difference image, whose characteristic region has a spatial frequency component resulting from converting the difference between the characteristic region image and the enlarged image into a space frequency region, and whose non-characteristic region has a smaller amount of data of space frequency component.

As explained above, the compression section 240 encodes the differences among the images of a plurality of layers between which the resolution is different from each other, in a layering technique. As can be understood, a part of the compression method adopted by the compression section 240 in the present configuration includes the compression method according to H.264/SVC. Note that when the image processing apparatus 170 expands the compressed moving image in such layers as stated above, the captured image of the original resolution can be generated by decoding the moving image data in each layer, and performing, for the region having been encoded according to the inter-layer difference technique, additive processing between the region and the decoded image corresponding to the layer adopted in the inter-layer difference technique.

Figure 6:
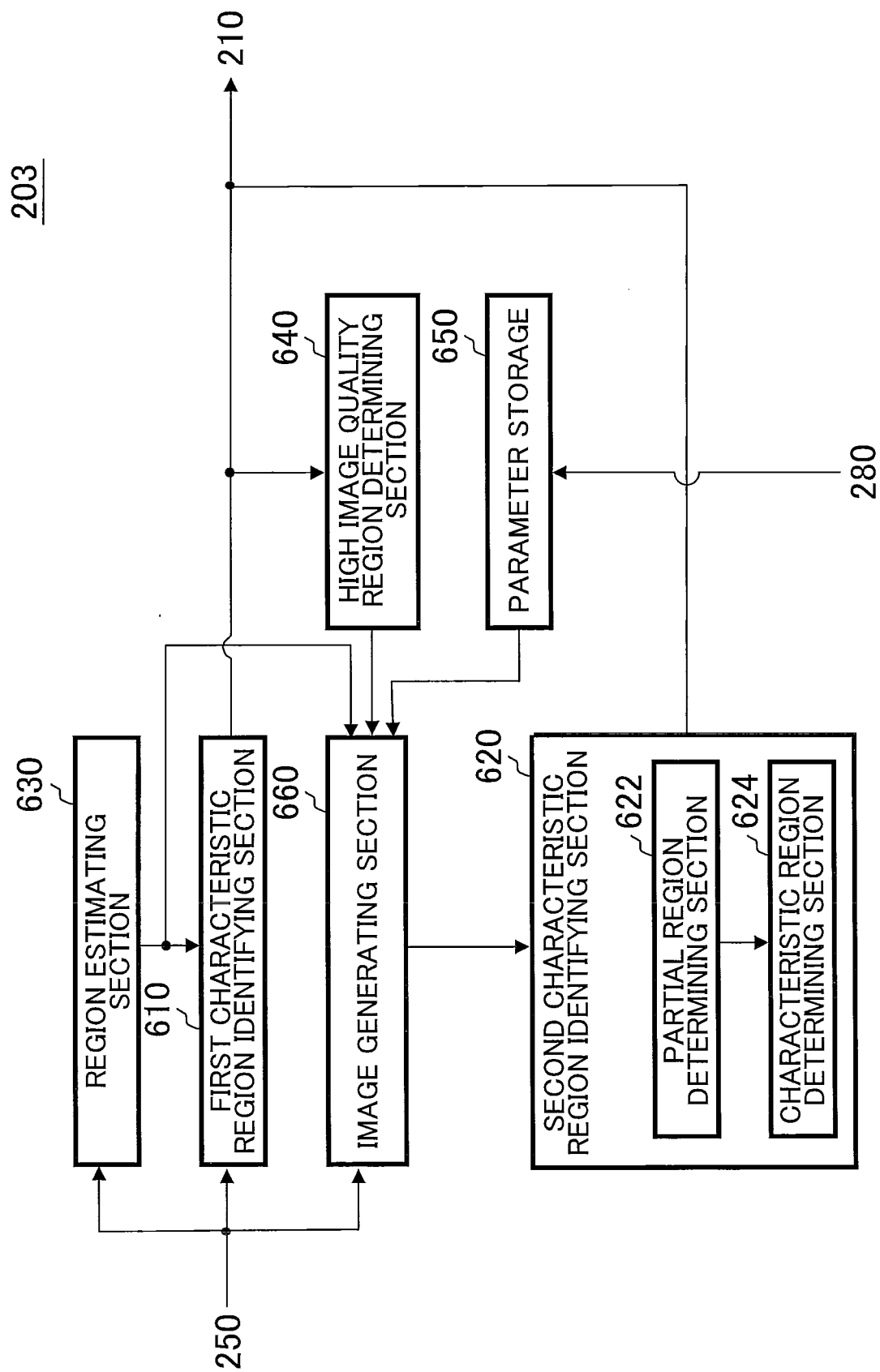
FIG. 6 shows an example of a block configuration of a characteristic region identifying section 203.

FIG. 6 shows an example of a block configuration of a characteristic region identifying section 203. The characteristic region identifying section 203 includes a first characteristic region identifying section 610, a second characteristic region identifying section 620, a region estimating section 630, a high image quality region determining section 640, a parameter storage 650, and an image generating section 660. The second characteristic region identifying section 620 includes a partial region determining section 622 and a characteristic region determining section 624.

The first characteristic region identifying section 610 obtains, from the image obtaining section 250, a captured image, which is specifically a moving image constituting image included in a moving image. The first characteristic region identifying section 610 identifies a characteristic region from this captured image. The first characteristic region identifying section 610 may identify the characteristic region from the captured image, by detecting the characteristic region using the detection method explained as the operation of the characteristic region identifying section 203 with reference to FIG. 2.

The image generating section 660 generates, from the captured image, a high quality image in which a particular region, from among the regions not determined as the characteristic region by the first characteristic region identifying section 610, is rendered in high image quality, where the particular region is highly likely to be determined as a characteristic region. The second characteristic region identifying section 620 searches for characteristic regions from the high quality image. Both of the characteristic regions identified by the first characteristic region identifying section 610 and the second characteristic region identifying section 620 are supplied to the compression control section 210, as the characteristic regions identified by the characteristic region identifying section 203.

Note that the second characteristic region identifying section 620 may perform more elaborated search for characteristic regions in the high quality image, than the search performed by the first characteristic region identifying section 610. For example, the second characteristic region identifying section 620 may be implemented by a detector capable of detecting a characteristic region with higher accuracy than the detection accuracy at which the first characteristic region identifying section 610 identifies a characteristic region. To be more specific, the second characteristic region identifying section 620 may be implemented by a detector capable of detecting with higher accuracy than the detection accuracy of the detector implemented as the first characteristic region identifying section 610.

The second characteristic region identifying section 620 may perform more elaborated search for characteristic regions in the input image, than the search performed by the first characteristic region identifying section 610. For example, the second characteristic region identifying section 620 may be implemented by a detector capable of detecting a characteristic region with higher accuracy than the detection accuracy at which the first characteristic region identifying section 610 identifies a characteristic region. To be more specific, the second characteristic region identifying section 620 may be implemented by a detector capable of detecting with higher accuracy than the detection accuracy of the detector implemented as the first characteristic region identifying section 610.

The image generating section 660 generates, from the captured image, a high quality image, starting from region(s) having higher probability of being detected as a characteristic region, from among the regions not determined as the characteristic region by the first characteristic region identifying section 610. The image generating section 660 may generate a high quality image by performing image processing on the captured image.

The image generating section 660 may generate, from the captured image, a higher quality image for a region having higher probability of being detected as a characteristic region, from among the regions not determined as the characteristic region by the first characteristic region identifying section 610 after identification of the characteristic region by the first characteristic region identifying section 610. In the above explanation, "the regions not determined as the characteristic region by the first characteristic region identifying section 610" may be a region not identified as a characteristic region at least by the first characteristic region identifying section 610, and to which the second characteristic region identifying section 620 conducts a search for a characteristic region.

"The regions not determined as the characteristic region by the first characteristic region identifying section 610" may also be a region not predicted to be identified as a characteristic region by the first characteristic region identifying section 610. For example, when the first characteristic region identifying section 610 detects, as a characteristic region, a region that satisfies a predetermined condition, "the regions not determined as the characteristic region by the first characteristic region identifying section 610" may be a region that does not satisfy the condition. The image generating section 660 may generate a high quality image when the first characteristic region identifying section 610 has not identified any characteristic region.

Note that in this block diagram, the first characteristic region identifying section 610 and the second characteristic region identifying section 620 are shown in different functional blocks from each other, however may be implemented as a single functional element. For example, the first characteristic region identifying section 610 and the second characteristic region identifying section 620 may at least partly share a hardware element such as an electric circuit for detecting a characteristic region, a software element such as software for detecting a characteristic region, and the like.

Note that the above explanation takes an example that the image generating section 660 generates a high quality image of the input image. The image generating section 660 may also generate an image having a higher image quality than the image used by the first characteristic region identifying section 610 in identifying a characteristic region, and provide it to the second characteristic region identifying section 620. For example, when the first characteristic region identifying section 610 identifies a characteristic region by performing predetermined image processing on an input image, the image generating section 660 may generate an image having a higher image quality than the image obtained from this image processing, and provide it to the second characteristic region identifying section 620.

In this way, the high quality image in the present embodiment may be an image having an image quality at least higher than the image used by the first characteristic region identifying section 610 in identifying a characteristic region, and include both of an image having a higher image quality than the input image and an image having a lower image quality than the input image. In this way, the image generating section 660 generates, from the input image, high quality images of the regions not determined as the characteristic region by the first characteristic region identifying section 610, to have an image quality in accordance with the possibility of being detected as a characteristic region. In addition, the image generating section 660 may generate high quality images having an image quality of accuracy in accordance with the possibility of being detected as a characteristic region. Note that the high quality image in the present embodiment is an example of the image quality changed image of the present invention.

The region estimating section 630 estimates a region to be identified as a characteristic region in the captured image. For example, when the characteristic region identifying section 203 should identify the region including a moving object in a moving image as a characteristic region, the region estimating section 630 estimates the region in which a moving object is likely to exist in the moving image. For example, the region estimating section 630 estimates the position of the moving object, based on the position of the moving object extracted from one or more other captured images included as moving image constituting image(s) in the same moving image, the timing at which the one or more other captured images are captured, and so on. Then, the region estimating section 630 may estimate, as the region including the moving object in a moving image, a region of a predetermined size including the estimated position.

In doing so, the first characteristic region identifying section 610 identifies the region including the moving object, as a characteristic region, using the region of the captured image estimated by the region estimating section 630. Then, the image generating section 660 may generate a high quality image in which the region, from among the regions estimated by the region estimating section 630, which is not identified as including a moving object by the first characteristic region identifying section 610 is rendered in higher image quality.

By performing this operation, when no moving object is detected from a region having a high possibility of containing a moving object, the possibility increases for extracting a moving object by the next search. In this way, the probability of false negative about the detection of a characteristic region is reduced in the characteristic region identifying section 203.

The partial region determining section 622 determines whether one or more partial regions in a predetermined position of a particular image region satisfy a predetermined condition. Then, the characteristic region determining section 624 determines whether the particular image region is a characteristic region based on the determination result of the partial region determining section 622. For example, when determining whether a particular image region is a characteristic region, the partial region determining section 622 determines whether a plurality of partial regions different from each other on the particular image region satisfy the predetermined condition, for each partial region. Then, the characteristic region determining section 624 determines that the particular image region is a characteristic region when the number of partial regions having a negative determination result is smaller than a predetermined value.

When the second characteristic region identifying section 620 determines whether a particular image region is a characteristic region, by means of the above-explained processing performed on one or more partial regions at a predetermined position in the particular image region, the image generating section 660 may generate a high quality image in which only the one or more partial regions are caused to have a high image quality. By doing so, only the regions useful in characteristic region detection can be rendered in high image quality, which helps reduce the operation amount required for re-detecting a characteristic region.

The high image quality region determining section 640 determines a region to be rendered in high image quality by the image generating section 660. Specifically, the high image quality region determining section 640 determines the region to be rendered in high image quality by the image generating section 660, to be wide when there is a small possibility that the region is identified as a characteristic region. The image generating section 660 generates a high quality image in which the region determined by the high image quality region determining section 640 is rendered in higher image quality. This increases the possibility of extracting a moving object by the next search, and reduces the probability of false negative about the detection of a characteristic region, in the characteristic region identifying section 203.

The parameter storage 650 stores image processing parameters used to render the image in high image quality, in association with the feature values extracted from the image. The image generating section 660 uses an image processing parameter stored in the parameter storage 650 in association with a feature value that corresponds to the feature value extracted from the region to be rendered in high image quality, to generate a high quality image of the region. The parameter storage 650 may store image processing parameters calculated in the learning performed using, as a teacher image, a plurality of images from which feature values similar to each other are extracted, in association with a representative feature value representing the similar feature values. The image processing parameters may be image data including a spatial frequency component of a frequency region higher than a frequency region to be added to the image data to be rendered in high image quality. Alternatively, the image processing parameters may be a vector, a matrix, a tensor, an n-dimension contaminated normal distribution, and an n-dimension contaminated polynomial distribution. Here, "n" is an integer equal to or greater than 1. The image processing parameters are detailed later with reference to the operation of the image processing apparatus 170.

The external information obtaining section 280 obtains, from outside, at least one of the plurality of image processing parameters and feature values stored in the parameter storage 650. The parameter storage 650 may store at least one of the image processing parameters and feature values obtained by the external information obtaining section 280.

FIG. 7 shows an example of identifying processing of a characteristic region, performed by the characteristic region identifying section 203. This example explains the identifying processing to identify a characteristic region in the captured image 700.

The first characteristic region identifying section 610 calculates the matching level of a plurality of image regions of the captured image 700 with respect to a predetermined condition. The first characteristic region identifying section 610 identifies, as a characteristic region, a region 710-1 and a region 710-2 of the captured image, which have a matching level with respect to the predetermined condition greater than a first threshold value.

Then, the high image quality region determining section 640 selects a region 710-3 and a region 710-4 of the captured image, which have a matching level with respect to the predetermined condition equal to or smaller than the first threshold value and greater than a second threshold value. Then, the high image quality region determining section 640 determines a region 710-5, which includes a region 710-3 and has a size corresponding to the matching level of the image of the region 710-3 with respect to the condition, as a region to be rendered in high image quality by the image generating section 660. Then, the high image quality region determining section 640 determines a region 710-6, which includes a region 710-4 and has a size corresponding to the matching level of the image of the region 710-4 with respect to the condition, as a region to be rendered in high image quality by the image generating section 660.

In the example of this drawing, since the region 710-4 is calculated to have a smaller matching level than for the region 710-3, the high image quality region determining section 640 determines the region 710-6 obtained by enlarging the region 710-4 at a larger enlargement factor, as the region to be rendered in high image quality by the image generating section 660. In this way, the high image quality region determining section 640 determines a region obtained by enlarging the region having a matching level with respect to a condition larger than a predetermined second threshold value, at an enlargement factor corresponding to the matching level, as the region to be rendered in high image quality by the image generating section 660.

Then, the second characteristic region identifying section 620 searches for a characteristic region in the images of the region 710-5 and the region 710-6 that have been rendered in high image quality. The second characteristic region identifying section 620 may search for the region matching the condition, from the images of the region 710-5 and the region 710-6 that have been rendered in high image quality, by means of the similar processing adopted by the first characteristic region identifying section 610. Assume that the second characteristic region identifying section 620 has identified the region 722 as matching the condition, in the image 720 of the region 710-5 having been rendered in high image quality. In this case, the characteristic region identifying section 203 identifies, as a characteristic region, the region 710-7 corresponding to the region 722 of the image 720, in addition to the region 710-1 and the region 710-2 identified by the first characteristic region identifying section 610.

In this way, the image generating section 660 generates, from the captured image, a high quality image of a region having a larger matching level with respect to a predetermined condition, from among the regions not identified as a characteristic region by the first characteristic region identifying section 610. Specifically, the image generating section 660 generates a high quality image of a region whose matching level with respect to the predetermined condition is larger than a predetermined second threshold value, from among the regions not identified as a characteristic region by the first characteristic region identifying section 610. By doing so, the possibility of extracting a characteristic region can be increased, by using a region highly likely to be a characteristic region, to prevent the probability of false negative about the detection of a characteristic region.

As explained so far, any region other than the region identified as a characteristic region by the first characteristic region identifying section 610 and the region to be rendered in high image quality is determined as a non-characteristic region that is not a characteristic region. Here, the first threshold value may be set so that the probability that a non-characteristic region is determined as a characteristic region is larger than a predetermined value, based on the identification result of the first characteristic region identifying section 610 and the second characteristic region identifying section 620, the test result in advance, or the test result thereafter. By doing so, the possibility that the region identified as a characteristic region by the first characteristic region identifying section 610 includes a non-characteristic region is reduced. There is a chance that the matching level of a non-characteristic region is calculated to be close the first threshold value. Even if that happens, by setting the first threshold value in the above way, the possibility of mistakenly detecting such a region as a characteristic region can be reduced.

Moreover, the second threshold value may be set so that the matching level calculated from a characteristic region will be equal to or greater tan the second threshold value, based on the identification result of the first characteristic region identifying section 610 and the second characteristic region identifying section 620, the test result in advance, or the test result thereafter. By doing so, the possibility that the region calculated to have a matching level equal to or smaller than the second threshold value includes a characteristic region is reduced. There is also a chance that the matching level of a characteristic region is calculated to be close the second threshold value. Even if that happens, by setting the second threshold value in the above way, the possibility of mistakenly detecting such a region as a non-characteristic region can be reduced.

There is also a chance that a region calculated to have a matching level greater than the second threshold value but smaller than or equal to the first threshold value includes a characteristic region, depending on how the first threshold value and the second threshold values are set. In that region, the second characteristic region identifying section 620 in the characteristic region identifying section 203 searches for a characteristic region after rendering that region in high image quality, which helps separate the characteristic regions from the non-characteristic regions, and both of the probability of false negative (i.e. mistakenly identify a characteristic region as a non-characteristic region) and false positive (i.e. mistakenly identify a non-characteristic region as a characteristic region) about the detection of a characteristic region can be reduced. In this way, the characteristic region identifying section 203 can provide a characteristic region detector whose sensitivity and specificity are both high.

The image generating section 660 may also generate a high quality image of at least a part of the image region of the input image at a high image quality accuracy corresponding to the matching level with respect to the condition, in addition to determining whether to perform high image quality processing according to the relation between the matching level and the threshold value as explained above. In this case, the high image quality accuracy can be determined by a continuous function or a discontinuous function corresponding to the matching level.

Figure 8:
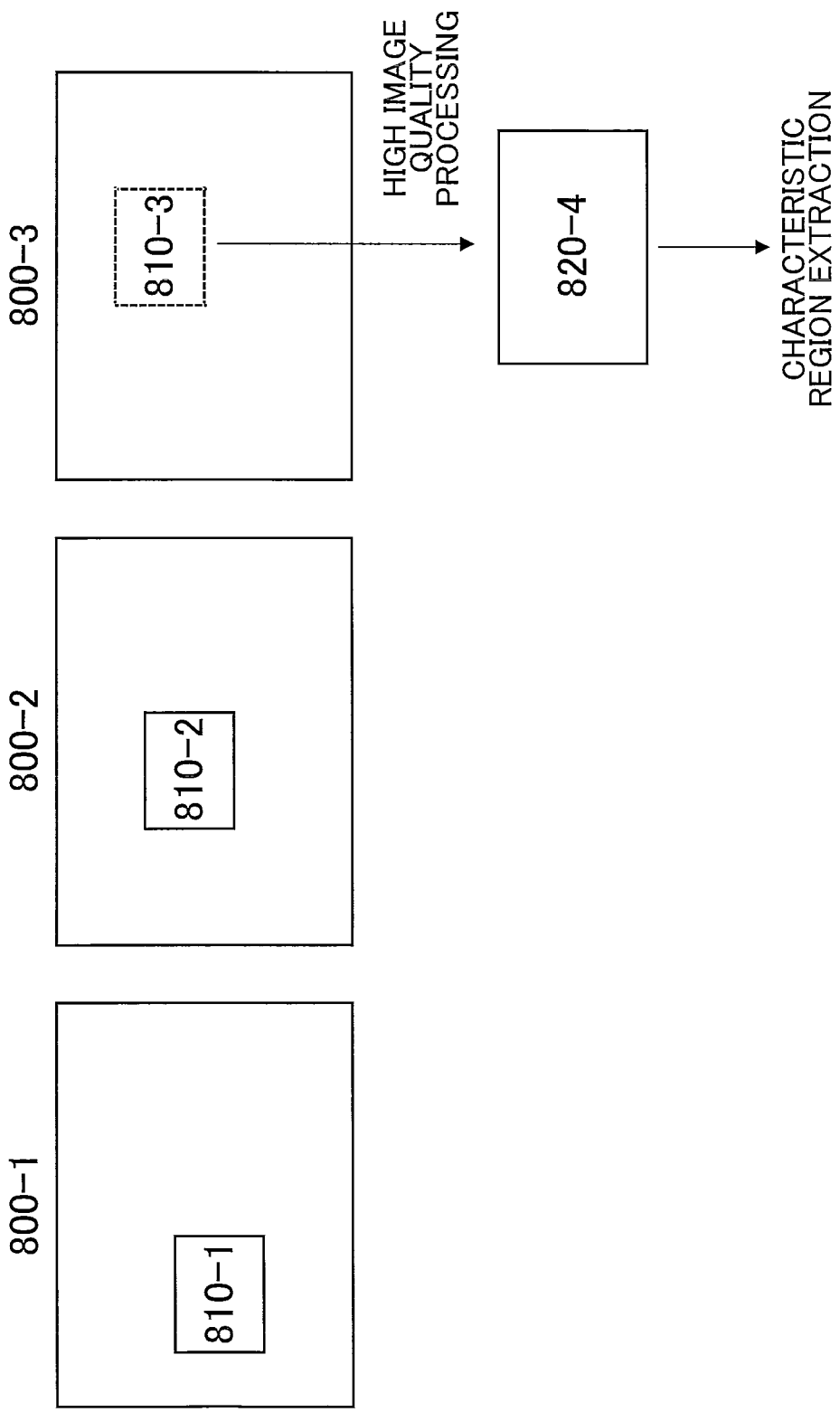
FIG. 8 shows another example of identifying processing of a characteristic region, performed by the characteristic region identifying section 203.

FIG. 8 shows another example of identifying processing of a characteristic region, performed by the characteristic region identifying section 203. In particular, an example of processing performed by the characteristic region identifying section 203 in identifying a region of a moving object as a characteristic region from a moving image is explained.

Here, assume that the first characteristic region identifying section 610 or the second characteristic region identifying section 620 have identified a region 810-1 and a region 810-2 as a characteristic region, in a captured image 800-1 and a captured image 800-2. Also assume that both of the region 810-1 and the region 810-2 contain the object corresponding to the same subject.

In this case, the region estimating section 630 determines that the region 810-3 should contain the object corresponding to the same subject, by referring to the position of the region 810-1 and the region 810-2 on the image, the timing at which each of the captured image 800-1 and the captured image 800-2 is captured, and the timing at which the captured image 800-3 is captured. For example, the region estimating section 630 calculates the speed of the moving object on the image region, from the position of the region 810-1 and the region 810-2 on the image, and the timing at which each of the captured image 800-1 and the captured image 800-2 is captured, and using the calculated speed, the position of the region 810-2, and the time difference between the timing at which the captured image 800-2 is captured and the timing at which the captured image 800-3 is captured, the region estimating section 630 determines that the region 810-3 should contain the object corresponding to the same subject.

The first characteristic region identifying section 610 searches for a moving object from the region 810-3. When the first characteristic region identifying section 610 has not detected a moving object from the region 810-3, the image generating section 660 generates a high quality image 820-4 of the region 810-3. Then, the second characteristic region identifying section 620 searches for a moving object from the high quality image 820-4. As a result, the possibility of extracting a moving object from the region highly likely to contain the moving object can be enhanced, to reduce the probability of false negative about the detection of the moving object.

Note that the image generating section 660 may generate a high quality image 820-4 in which a central region of the region 810-3 is rendered in high image quality. Accordingly, the region less likely to contain the moving object can be rendered in reduced level of high image quality. This may help reduce the operation amount incurred to generate a high quality image, compared to generating a high quality image for the entire region.

Figure 9:
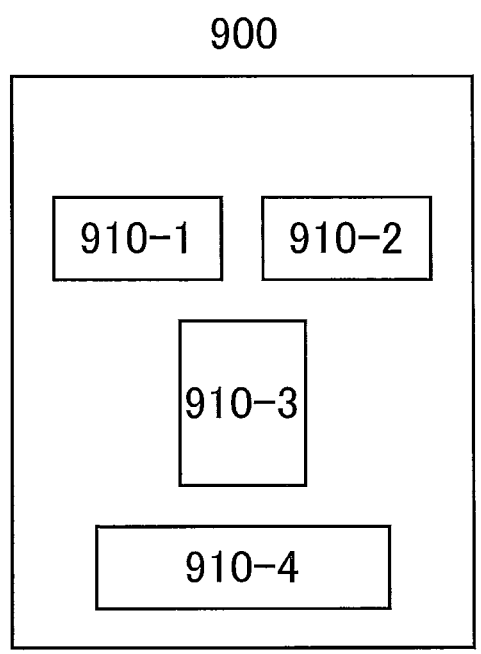
FIG. 9 shows an example of determining processing of a characteristic region, performed by a second characteristic region identifying section 620.

FIG. 9 shows an example of determining processing of a characteristic region, performed by the second characteristic region identifying section 620. When determining whether a particular image region 900 is a characteristic region, the second characteristic region identifying section 620 extracts feature values from the partial regions 910-1 through 910-4 having a predetermined positional relation with each other within the image region 900. Specifically, the second characteristic region identifying section 620 extracts the feature value of a predetermined type from each of the partial regions 910, according to the positions of the partial regions 910 in the image region 900.

The second characteristic region identifying section 620 calculates the matching level of the feature value extracted from the image of each partial region 910, with respect to a predetermined condition. The second characteristic region identifying section 620 determines whether the image region 900 is a characteristic region, based on the matching level calculated for each partial region 910. The second characteristic region identifying section 620 may determine that the image region 900 is a characteristic region when the weighted summation of the matching level exceeds a predetermined value. The second characteristic region identifying section 620 may determine that the image region 900 is a characteristic region when the number of partial regions 910 whose matching level is larger than a predetermined value exceeds a predetermined value.

Note that an image filter can implement the above-explained processing from the feature value extraction to the matching level calculation. This processing may also be implemented as a weak classifier. Moreover, the position of the partial regions 910 may be determined depending on the type of the object to be extracted as a characteristic region. For example, in extracting, as a characteristic region, the region containing the object of a face of a person, the partial regions 910 may be set at a position at which the capability of discerning the object of a face of a person is higher than a predetermined value. Here, the high discerning capability indicates that the probability of the result of discerning the object of a face of a person turns out to be true is high, while the result of discerning the object of other than a face of a person turns out to be false is high.

Here, the image generating section 660 only renders the partial regions 910 into high quality image, and not the region other than the partial regions 910. As described above, the second characteristic region identifying section 620 extracts a characteristic region from the high quality image, to determine whether the image region 900 is a characteristic region. Accordingly, the image region to be rendered in high image quality can be limited, while enhancing the detection probability of a characteristic region, and enabling to detect a characteristic region quickly and with high probability. Although the above-description has dealt with the determining processing of a characteristic region performed by the second characteristic region identifying section 620, the first characteristic region identifying section 610 may also adopt the same determining processing.

The processing in the first characteristic region identifying section 610 and the second characteristic region identifying section 620 can be implemented by a plurality of weak classifiers. The following takes an example of adopting total of N weak classifiers. The first characteristic region identifying section 610 uses Nf weak classifiers to discern a characteristic region. The matching level is calculated based on the discerning result. As already explained, a region whose matching level is larger than the first threshold value is determined as a characteristic region, and a region whose matching level is smaller than or equal to the second threshold value is determined as a non-characteristic region.

A region whose matching level is smaller than or equal to the first threshold value and greater than the second threshold value is rendered in high image quality by the image generating section 660. The second characteristic region identifying section 620 discerns a characteristic region from the resulting high quality image, by using Nf weak classifiers adopted by the first characteristic region identifying section 610 and Nb weak classifiers other than the Nf weak classifiers. For example, a characteristic region can be discerned based on the matching level calculated using each discerning result from Nf+Nb weak classifiers.

Note that different types of processing may be adopted for determining a characteristic region, for a plurality of regions, from among the regions not determined as a characteristic region by the first characteristic region identifying section 610, which are determined according to a result of comparing them with a third threshold value smaller than the first threshold value and grater than the second threshold value. For example, the regions calculated to have a matching level greater than the third threshold value may be subjected to discerning processing as to whether they are a characteristic region by means of Nf+Nb weak classifiers in the second characteristic region identifying section 620, without being subjected to high image quality processing by the image generating section 660. On the other hand, the region calculated to have a matching level smaller than or equal to the third threshold value may be subjected to the high image quality processing by the image generating section 660, and then to the discerning processing as to whether they are a characteristic region by means of Nf+Nb weak classifiers in the second characteristic region identifying section 620.

The number of weak classifiers Nb used in the processing by the second characteristic region identifying section 620 may be adjusted depending on the matching level. For example, for regions having a smaller matching level, a more number of weak classifiers may be used by the second characteristic region identifying section 620 to discern a characteristic region therefrom. As explained above, the second characteristic region identifying section 620 may perform a more elaborated search for a characteristic region from an image quality changed image with lower matching level. Note that an exemplary weak classifier configuration in at least one of these first characteristic region identifying section 610 and second characteristic region identifying section 620 is an AdaBoost weak classifier configuration.

Note that the first characteristic region identifying section 610 and second characteristic region identifying section 620 may detect a characteristic region respectively from a group of low resolution images in a multiple resolution representation. In this case, the image generating section 660 may generate such a group of low resolution images by performing multiple resolution processing in higher accuracy than the multiple resolution representation in the first characteristic region identifying section 610. An example of the multiple resolution processing of the first characteristic region identifying section 610 is scaling down using a bi-cubic convolution technique. An example of the multiple resolution processing of the second characteristic region identifying section 620 is scaling down based on pre-learning. The second characteristic region identifying section 620 may generate a group of low resolution images from the input image, using an image processing parameter obtained through the learning utilizing a full-size image and an image of a targeted resolution. It is desirable to use an image of a targeted resolution having smaller folding noise. For example, an image obtained by several image capturing apparatuses having a different number of image capturing elements from each other can be used in the learning processing.

An example of the high image quality processing explained with reference to FIG. 3, FIG. 6 through FIG. 9 is high resolution processing. That is, the image generating section 660 may render regions having a higher possibility of being determined as a characteristic region, into higher resolution. An example of the high resolution processing may be super resolution detailed later.

Examples of the high image quality processing are multiple tone processing for increasing the number of tones, and multi-color processing for increasing the number of colors. That is, the image generating section 660 may render regions having a higher possibility of being determined as a characteristic region, to have more tones. In addition, the image generating section 660 may render regions having a higher possibility of being determined as a characteristic region, to have more colors.

Note that when a captured image is a moving image constituting image of a moving image, subjecting the captured image to such high image quality processing as high resolution processing, multi-color processing, multiple tone processing, noise reduction, artifact reduction for reducing artifact such as block noise and mosquito noise, blurring reduction, sharpness processing, high frame rate processing, wide dynamic range processing, reduction of folding components, tone correction, aberration correction, and conversion (e.g. encoding) may be performed using a pixel value of another captured image. For example, the high image quality processing may be performed by utilizing the difference in the image capturing position of a movable object at each image capturing timing. That is, the image generating section 660 may generate a high quality image by using a captured image that is a moving image constituting image of a moving image, as well as another moving image constituting image of the moving image.

Examples of the noise reduction processing, other than the processing using a plurality of moving image constituting images, are processing described in Japanese Patent Application Publications Nos. 2008-167949, 2008-167950, 2008-167948, and 2008-229161. For example, the image generating section 660 may reduce noise using the result of pre-learning performed on an image having a larger amount of noise and an image having a smaller amount of noise. For example, a pair of a low quality image having a larger amount of noise and a high quality image having a lower amount of noise are used to learn about the conversion relation, in an attempt to reduce noise of a subject image using the learned conversion relation. In the case of reducing the amount of noise from an image captured by means of visible light, as in the present embodiment, the pre-learning may be performed by using an image captured under a small amount of ambient light, instead of using an image captured by a small dose of light as described in Japanese Patent Application Publication No. 2008-167949. Examples of the highly accurate sharpness processing among the sharpness processing are processing by means of a filter of a larger size, and sharpness processing in multiple directions.

Figure 10:
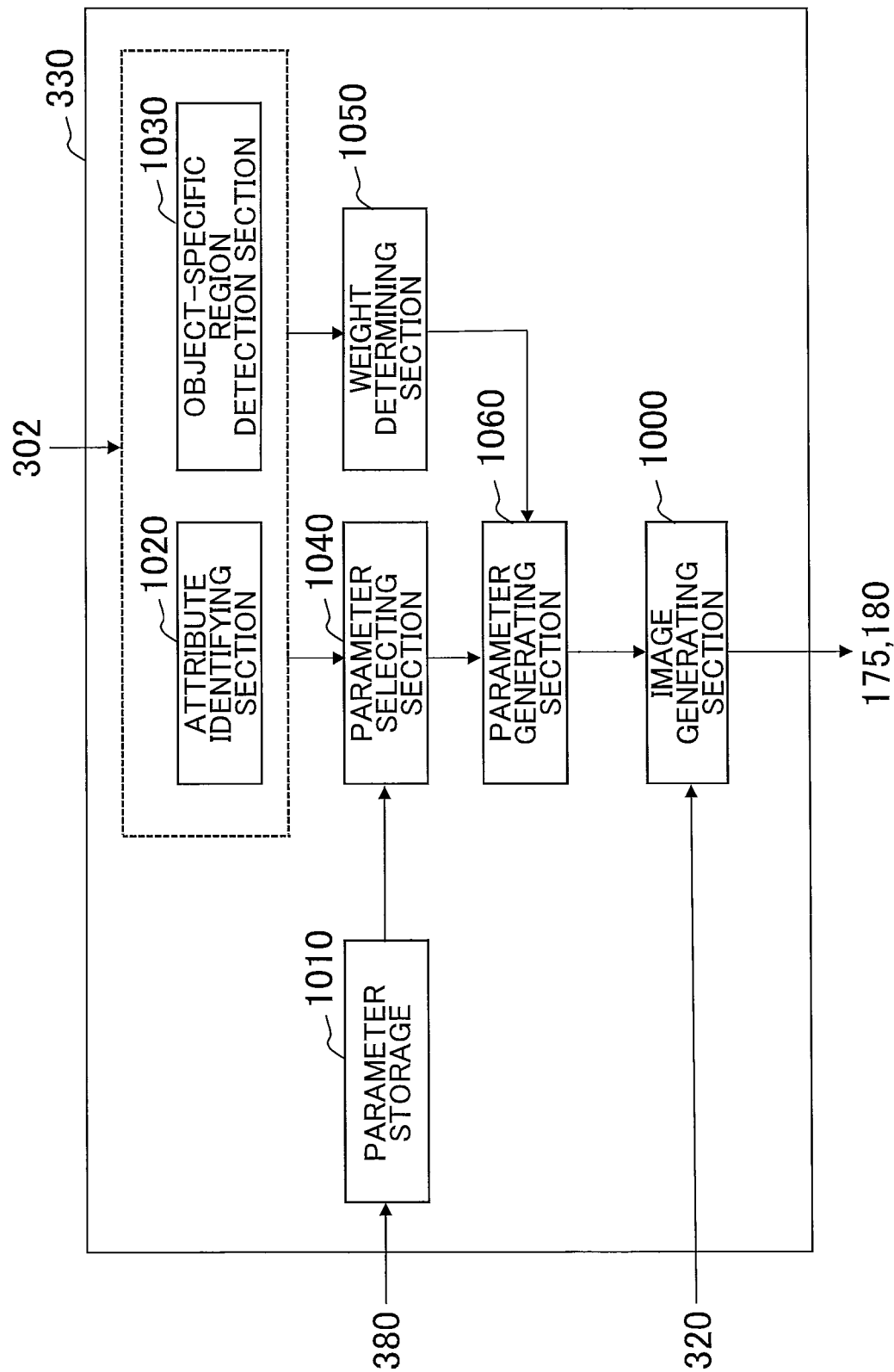
FIG. 10 shows an example of a block configuration of an image processing section 330 included in the image processing apparatus 170.

FIG. 10 shows an example of a block configuration of an image processing section 330 included in the image processing apparatus 170. The image processing section 330 includes a parameter storage 1010, an attribute identifying section 1020, an object-specific region detection section 1030, a parameter selecting section 1040, a weight determining section 1050, a parameter generating section 1060, and an image generating section 1000.

The parameter storage 1010 stores a plurality of image processing parameters, in association with a plurality of subject image attributes, each image processing parameter being used to generate a subject image having a corresponding attribute. The attribute identifying section 1020 identifies the attribute of a subject image included in the input image. Here, the input image may be a frame image obtained by the expanding section 320. The parameter selecting section 1040 selects a plurality of image processing parameters stored in the parameter storage 1010 in association with an attribute that corresponds more to the attribute identified by the attribute identifying section 1020. The image generating section 1000 generates a high quality image of a subject image contained in the input image, using the plurality of image processing parameters selected by the parameter selecting section 1040.

Here, an example of the attribute is a state of a subject such as an orientation of a subject. That is, the parameter storage 1010 stores a plurality of image processing parameters in association with a plurality of attributes, each attribute indicating a state of a subject captured as a subject image. The attribute identifying section 1020 identifies a state of a subject captured as a subject image included in an input image, from the subject image.

An example of the state of a subject is an orientation of a subject when captured as an image. That is, the parameter storage 1010 stores a plurality of image processing parameters in association with a plurality of attributes, each attribute indicating an orientation of a subject captured as a subject image. The attribute identifying section 1020 identifies an orientation of a subject captured as a subject image included in an input image, from the subject image. An example of the orientation of a subject is an orientation of a face (facial orientation) of a person (an example of a subject). That is, the parameter storage 1010 stores a plurality of image processing parameters in association with a plurality of attributes, each attribute indicating an orientation of a face of a subject captured as a subject image. The attribute identifying section 1020 identifies an orientation of a face of a person captured as a subject image included in an input image, from the subject image.

Another example of the attribute is a type of a subject. That is, the parameter storage 1010 stores a plurality of image processing parameters in association with a plurality of attributes, each attribute indicating a type of a subject captured as a subject image. The attribute identifying section 1020 identifies a type of a subject captured as a subject image included in an input image, from the subject image.

Here, an example of the type of a subject is sex of a person (subject). That is, the parameter storage 1010 stores a plurality of image processing parameters in association with a plurality of attributes each attribute indicating sex of a person captured as a subject image. The attribute identifying section 1020 identifies sex of a person captured as a subject image included in an input image, from the subject image. A still different example of the type of a subject is age of a person. That is, the parameter storage 1010 stores a plurality of image processing parameters in association with a plurality of attributes, each attribute indicating age of a person captured as a subject image. The attribute identifying section 1020 identifies age of a person captured as a subject image included in an input image, from the subject image. A still different example of the type of a subject is a facial expression and the like.

Examples of the attribute of a subject image, other than the orientation of a subject and the type of a subject, include a size and a position of a subject, a facial expression of a person, an gesture of a person, a posture of a person, race of a person, clothing of a person, illumination state, or the like. Examples of the closing are glasses, sun-glasses, masks, and hats, which a person can wear on the head or in its vicinity. The parameter storage 1010 may store a plurality of image processing parameters in association with a plurality of attributes at least including one of these types of attributes. In this case, the attribute identifying section 1020 identifies the attribute corresponding to the person captured as the subject image included in the input image, from the subject image. Note that an attribute of a subject image can include such a wide variety of modalities.

The weight determining section 1050 determines a weight to be assigned to a plurality of image processing parameters, in generating a high quality image of the subject image included in the input image. The image generating section 1000 generates a high quality image of an input image using the plurality of image processing parameters selected by the parameter selecting section 1040 based on the weight determined by the weight determining section 1050. The weight determining section 1050 may determine a larger weight for an image processing parameter associated with an attribute whose matching level with respect to the identified attribute is larger.

The parameter generating section 1060 generates a combination parameter that is a combination between the plurality of image processing parameters selected by the parameter selecting section 1040. The image generating section 1000 generates a high quality image of a subject image included in the input image using the combination parameter generated by the parameter generating section 1060.

Note that the above-explanation is about generating an image processing parameter according to an attribute of a subject. Alternately, the image processing section 330 may change, on the image, the level of the high image quality processing.

The parameter storage 1010 stores an object-specific parameter being an image processing parameter used in rendering a predetermined object in high image quality, a general parameter being an image processing parameter used in rendering other objects than the predetermined object in high image quality. A general parameter may be a general image processing parameter producing a certain level of high image quality effect regardless of the object, as detailed later.

The object-specific region detection section 1030 detects an object-specific region (a region corresponding to a predetermined object) from the input image. Then the weight determining section 1050 determines an object-specific parameter and a general parameter in rendering, into high image quality, an input image from which the object-specific region has been detected. The image generating section 1000 generates a high quality image in which the input image is rendered in high image quality using both of the object-specific parameter and the general parameter, based on the weight determined by the weight determining section 1050.

Here, the predetermined object may be an object of a subject to be detected as a characteristic region. The weight determining section 1050 determines a larger weight for the object-specific parameter than for the general parameter, for an image of an object-specific region in an input image. By doing so, the predetermined object to be detected as a characteristic region can be rendered in high image quality appropriately. In addition, the weight determining section 1050 determines a larger weight for the general parameter than for the object-specific parameter, for an image of a general region which is not the object-specific region, in an input image. By doing so, the image of the general region can be assuredly prevented from being converted into high image quality using the image processing parameter dedicated to a predetermined object.

Note that the parameter storage 1010 stores an object-specific parameter calculated by learning using a plurality of images of a predetermined object as a training image, and a general parameter calculated by learning using a plurality of images that are not about a predetermined object, as a training image. By doing so, an object-specific parameter dedicated to a predetermined object can be calculated. A general-purpose object-specific parameter that can be used to various objects can also be generated.

Note that the pre-learning preferably learns the image processing parameter using spatial change information such as edge information of a training image, and not the luminous information itself of the training image. By using such edge information in which information on a low spatial frequency region is reduced, robust high image quality processing can be realized for the illumination fluctuation (especially, illumination change in low frequency).

Note that the parameter generating section 1060 may generate a combination parameter by combining a general parameter and an object-specific parameter at a weight determined by the weight determining section 1050. The image generating section 1000 may generate a high quality image of the input image, by rendering the input image into high image quality using the combination parameter generated by the parameter generating section 1060.

The above example has dealt with the operation in generating a high quality image, using a plurality of image processing parameters selected based on the attributes of a subject identified by the attribute identifying section 1020. The image generating section 1000 may also renders into high image quality the subject image contained in the input image, by using various combinations of a plurality of image processing parameters. For example, the image generating section 1000 may render into high image quality the subject image contained in the input image, by using various combinations of a plurality of predetermined image processing parameters. Then, the image generating section 1000 may select at least one image from a plurality of high quality images, after comparing them with the input image, and set the selected image as a high quality image. For example, the image generating section 1000 may select images as a high quality image, prioritizing images whose image contents are more similar to the input image.

Note that the parameter selecting section 1040 may select various combinations of a plurality of image processing parameters based on the attributes of the subject specified from the input image. The image generating section 1000 may render the subject image contained in the input image, using the selected plurality of image processing parameters. Then, the image generating section 1000 may also select at least one image of the plurality of high quality images, after comparing them with the input image, and set the selected image as a high quality image.

As explained so far, the image processing apparatus 170 may perform high image quality processing using an image processing parameter able to deal with the image of a subject having various attributes, even when the number of image processing parameters stored in the parameter storage 1010 is limited.

The external information obtaining section 380 obtains, from outside, the image processing parameters stored in the parameter storage 1010. The parameter storage 1010 stores image processing parameters obtained by the external information obtaining section 380. Specifically, the external information obtaining section 380 obtains, from outside, at least one of an object-specific parameter and a general parameter. The parameter storage 1010 stores at least one of the object-specific parameter and the general parameter obtained by the external information obtaining section 380.

Note that examples of the high image quality processing include high resolution processing, multiple tone processing, multi-color processing, noise reduction, artifact reduction, blurring reduction, sharpness processing, and high frame rate processing. The parameter storage 1010 can store image processing parameters for these various types of high image quality processing.

FIG. 11 shows an example of parameters stored in a parameter storage 1010 shown in table format. The parameter storage 1010 stores object-specific parameters A0, A1, . . . that are image processing parameters for a face of a person, in association with orientations of a face. The object-specific parameters A0, A1, . . . are calculated in advance in pre-learning using the images of corresponding orientations of a face as a training image.

The following explains the calculation of an object-specific parameter A in pre-learning, taking an example of high resolution processing to perform weighted addition of pixel values of peripheral pixels surrounding a targeted pixel. Here, assume that the the pixel value y of the targeted pixel is calculated by performing weighted addition of the pixel values $x_i$ (i=1−n) of the n peripheral pixels. That is, $y=\Sigma(w_i x_i)$. Here, $\Sigma$ indicates addition across i. $w_i$ is a weight factor for the pixel value $x_i$ of the peripheral pixels, and the weight factor $w_i$ becomes object-specific parameter A to be calculated in pre-learning.

Here, assume using, as training images, m facial images in which a face of a specified orientation is captured. If the pixel value of the targeted pixel of the kth (k=1−m) training image is $y_k$, $y_k=\Sigma w_i x_{k\,i}$. In this case, the weight factor $w_i$ can be calculated by an operation such as a least square method. For example, $w_i$ which substantially minimizes the square of the vector whose kth component $e_k$ is represented as e k=y k−$\Sigma$ ($w_i x_k$ i) can be calculated by an operation such as the least square method. By performing the calculation of the object-specific parameter on facial images of a plurality of orientations, the object-specific parameters A for various facial orientations can be calculated.

The parameter storage 1010 stores general parameters B for an object that is not a face of a person. The general parameters B are calculated in the pre-learning using the images of various types of subjects. Note that the general parameter B can be calculated in similar pre-learning process to the case of the object-specific parameter A. For example, the general parameter B can be calculated by using an image other than a facial image in the same pre-learning process as for calculating the object-specific parameter A.

Figure 12:
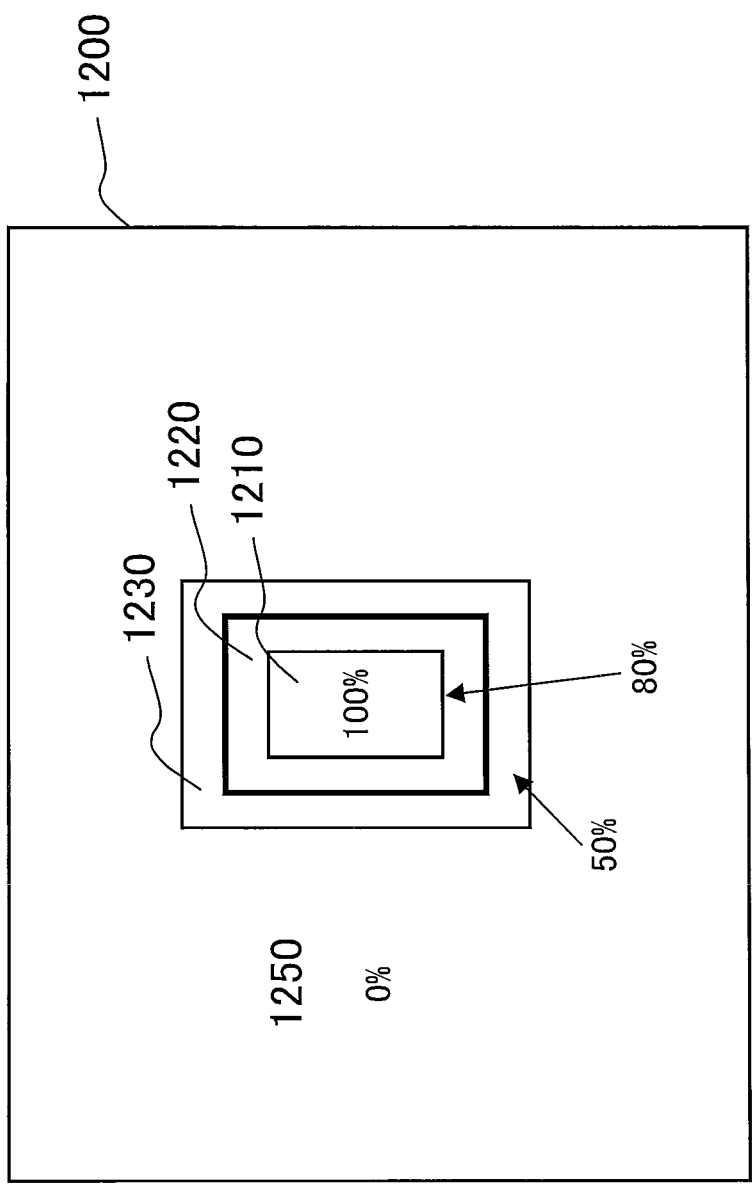
FIG. 12 shows an example of assigning weight to an object-specific parameter.

FIG. 12 shows an example of assigning weight to an object-specific parameter. Assume that a region 1210 and a region 1220 within the heavy line in the image 1200 have been detected as a characteristic region. The weight determining section 1050 determines the weight factor of an object-specific parameter to be 100%, and the weight factor of a general parameter to be 0%, for the region 1210 further inside the characteristic region. For the region 1220 in the region 1210 near the non-characteristic region, the weight factor is determined 80% for the object-specific parameter, and 20% for the general parameter.

As regards the region outside the characteristic region, for the region 1230 near the characteristic region, the weight factor of the object-specific parameter is set to be 50%, and the weight factor of the general parameter is set to be 50%. For a further outside region 1250, the weight factor of an object-specific parameter is set to be 0%, and the weight factor of a general parameter is set to be 100%.

In this way, the weight determining section 1050 determines a larger weight to object-specific parameter, for the image of the region further inside the object-specific region of the input image. Moreover, for the general region outside the object-specific region, the weight determining section 1050 determines a larger weight to an object-specific parameter for a region nearer the object-specific region. In this way, the weight determining section 1050 gradually decreases the weight factor, from the center of the characteristic region to outside, and from the characteristic region to the non-characteristic region. In addition to gradually decreasing the weight factor, the weight determining section 1050 may continuously decrease the weight factor, in proportion to the distance from the center of the characteristic region, or in proportion to the distance from the peripheral region of the characteristic region. For example, the weight determining section 1050 may determine the weight factor of the value that decreases with respect to the distance x either in the exponential form or in the exponential function (e.g., decreasing the weight factor according to the function such as $1/x$, $1/x^2$, and $e^{-x}$, with respect to the distance x).

The weight determining section 1050 may control the weight factor, according to the reliability of being detected as a characteristic region. Specifically, the weight determining section 1050 determines a larger weight for an object-specific parameter, for the image of the object-specific region having greater reliability of being detected as an object-specific region.

If there actually exists a predetermined object in a region not detected as a characteristic region, there are cases that the region cannot be detected as containing a predetermined object, even by being rendered in high image quality using a general-purpose general parameter. The image processing section 330 can perform high image quality processing taking advantage of the effect of the object-specific parameter for the predetermined object, even for regions not detected as a characteristic region, the determination on whether a predetermined object exists in the high quality image can be performed easily.

The object-specific parameter may be a combination of a plurality of image processing parameters explained with reference to FIG. 11. For example, suppose that the detected characteristic region contains the image of a person whose face is oriented laterally in 15 degrees from the front. In this case, the weight determining section 1050 determines the weight factor on the object-specific parameter A0 to be 25%, and the weight factor on the specified factor A1 to be 75%. Then, the parameter generating section 1060 generates a combination parameter combining object-specific parameter A0 and the object-specific parameter A1 respectively at the weight factors of 25% and 75%. Then, the image generating section 1000 performs the high image quality processing by using the image processing parameter resulting from weighting, at the ratio shown in FIG. 12, the combination parameter generated by the parameter combining section and the general parameter.

For example, when using an image processing parameter (either an object-specific parameter or a general parameter) for performing high image quality processing using a weighted addition of the peripheral pixels, the parameter generating section 1060 performs weighted addition, at the weight factor determined by the weight determining section 1050, the weight factor of the image processing parameter, to calculate a combination parameter represented by the resulting weight factor. Examples of the additive image processing parameter include a spatial frequency component in the spatial frequency region or pixel data itself (e.g., image data of a high frequency component), other than the weight factor.

When the high image quality processing is represented by a vector operation, a matrix operation, or a tensor operation on the feature value vector, for example, the parameter generating section 1060 may generate a combination parameter by weighted addition or multiplication of a vector, a matrix, a tensor, an n-dimension contaminated normal distribution, and an n-dimension contaminated polynomial distribution (which are the image processing parameters). Here, "n" is an integer equal to or greater than 1. For example, by performing vector interpolation in the characteristic vector space, the blurring due to the combination can be sometimes be alleviated on the vector that cannot be rendered in scalar representation. For example, an example of such an operation is to set, to be the characteristic vector of the 15 degree orientation, the summation of (a) the characteristic vector resulting from multiplying the characteristic vector of 0 degree orientation by the factor 0.25, and (b) the vector resulting from multiplying the characteristic vector of 20 degrees by the factor 0.75. Combination blurring can further be alleviated by interpolating on the space of various conversions detailed later (e.g., principal component analysis (PCA), and locality preserving projection (LPP)). The parameter generating section 1060 may calculate a combination parameter of an object-specific parameter and a general parameter. The parameter generating section 1060 may also calculate a combination parameter of a plurality of different object-specific parameters.

When adopting an object-specific parameter and a general parameter, the image generating section 1000 may generate a high quality image by adding image information obtained by image processing using the object-specific parameter and image information obtained by image processing using the general parameter, at the weight factor determined by the weight determining section 1050. The image generating section 1000 may also generate a high quality image, by performing image processing using a general parameter, on the image information obtained by image processing using an object-specific parameter. The similar processing can be utilized in high image quality processing using a plurality of object-specific parameters. Note that an example of the image information is a pixel value itself, a feature value vector, a matrix, an n-dimension contaminated normal distribution, and an n-dimension contaminated polynomial distribution, in the feature value space. For example, by performing vector interpolation in the characteristic vector space, the blurring due to the combination can be sometimes be alleviated on the vector that cannot be rendered in scalar representation.

In the high image quality processing explained with reference to FIGS. 11 and 12, the parameter selecting section 1040 has selected a plurality of image processing parameters used in generating a high quality image of the characteristic region, based on the orientation of the face of a person specified from the image within the characteristic region. Also, the image generating section 1000 has generated a single high quality image using the plurality of image processing parameters selected by the parameter selecting section 1040.

The image generating section 1000 may also generate a plurality of high quality images of a characteristic region, using a plurality of combinations of the image processing parameters stored in the image generating section 1000. The image generating section 1000 may select one of the plurality of high quality images, which is most similar to the image within the characteristic region, as the high quality image of the characteristic region.

For example, the image generating section 1000 uses a combination parameter between the object-specific parameter A0 corresponding to the orientation of 0 degree and the object-specific parameter A1 corresponding to the orientation of 20 degrees, to generate a high quality image of a characteristic region. The image generating section 1000 further generates one or more high quality images of the characteristic region, using one or more of the other combinations of object-specific parameters.

The image generating section 1000 compares the plurality of generated images, with the image within the characteristic region, to calculate a matching level thereamong. The image generating section 1000 determines, as the high quality image, the image whose matching level is the highest among the plurality of generated high quality images.

The image generating section 1000 may render a plurality of images of the characteristic region in high image quality, by means of each of the plurality of combination parameters based on the plurality of predetermined sets of object-specific parameters. In this case, the parameter selecting section 1040 can select the plurality of predetermined sets of object-specific parameters, not necessitating the attribute identifying section 1020 to identify the orientation of the face.

Alternatively, the parameter selecting section 1040 may select a plurality of sets of object-specific parameters based on the orientation of the face of a person specified from the image within the characteristic region. For example, the parameter selecting section 1040 may store the information for identifying a plurality of sets of object-specific parameters and the information for identifying the orientation of the face of a person, and select the plurality of sets of object-specific parameters stored in association with the orientation of the face of a person specified from the image within the characteristic region. Then, by generating a high quality image of the image within the characteristic region from each of the plurality of combination parameters based on the plurality of selected sets, a plurality of high quality images of the image of the characteristic region may be generated.

The image generating section 1000 may generate a plurality of high quality images of a characteristic region by using each of a plurality of object-specific parameters. The image generating section 1000 may select one of the plurality of obtained images, which is most similar to the image within the characteristic region, as the high quality image of the characteristic region. In this case, too, the parameter selecting section 1040 can select the plurality of predetermined sets of object-specific parameters, not necessitating the attribute identifying section 1020 to identify the orientation of the face, or the parameter selecting section 1040 may select a plurality of object-specific parameters based on the orientation of the face of a person specified from the image within the characteristic region.

As explained above with reference to FIG. 11, a training image of a specific facial orientation can be used to calculate the image processing parameter (object-specific parameter) for rendering a facial image of a specific facial orientation into high image quality can be calculated. Image processing parameters in association with a plurality of facial orientations respectively can also be calculated in the similar manner. The parameter storage 1010 stores, in advance, calculated image processing parameters in association with respectively corresponding facial orientations. Examples of the image processing parameter for rendering a facial image into high image quality are an image processing parameter for rendering the entire face into high image quality, and an image processing parameter for rendering only a partial object of a facial image, such as the image of eyes, the image of mouth, the image of a nose, and the image of ears, and so on.

The facial orientation is one example of the orientation of a subject in the present invention. Therefore, a plurality of image processing parameters can also be calculated for a plurality of orientations of a subject, respectively. When the subject is a human being (person), an example of the orientation of a subject is the orientation of a human body, and more specific examples are the orientation of a body part, the orientation of hands, and the like. Also when the subject is other than a human being, a plurality of image processing parameters can be calculated for respectively generating high quality images of the subject images containing the subject in a plurality of orientations, just as in the case of the facial image.

The orientation of the subject is an example of the state of the subject in the present invention, and the state of a subject can be classified by facial expressions of a person. In this case, the plurality of image processing parameters stored in the parameter storage 1010 are respectively used to generate high quality images of facial expressions different from each other. For example, the plurality of image processing parameters stored in the parameter storage 1010 may be used to generate high quality images respectively of facial expressions of a person in joy, anger, sorrow, and pleasure, facial expression of a person under stress, and straight face, or the like.

The state of a subject can also be classified according to the gestures of a person. In this case, the plurality of image processing parameters stored in the parameter storage 1010 may be used to generate high quality images of a person in different types of gestures respectively. For example, the plurality of image processing parameters stored in the parameter storage 1010 may be used to generate high quality images of a person running, a person walking fast, a person about to run, and a person looking for something, and so on, respectively.

The state of a subject can also be classified by the postures of a person. In this case, the plurality of image processing parameters stored in the parameter storage 1010 are respectively used to generate high quality images of postures of a person different from each other. For example, the plurality of image processing parameters stored in the parameter storage 1010 are respectively used to generate high quality images of a person with round shoulders, a person with his hands in his pockets, a person with his arms folded, and a person whose face is in orientation different from his body.

The state of a subject can also be classified by the closing of a person. In this case, the plurality of image processing parameters stored in the parameter storage 1010 are respectively used to generate high quality images of a person wearing clothing different from each other. For example, the plurality of image processing parameters stored in the parameter storage 1010 are respectively used to generate high quality images of a person wearing glasses, a person wearing sun glasses, a person wearing a mask, a person wearing a hat, and so on.

As described so far, a subject is classified into a plurality of attributes according to the plurality of states of the subject. A subject can also be classified into a plurality of attributes according to the types of the subject. An example of the type of a subject is the race of a person. The race of a person may be represented in a regional classification such as Asian and European, and may be classified from a physical anthropology point of view. In this case, the plurality of image processing parameters stored in the parameter storage 1010 may be used to render the images of men classified as belonging to different races, into high image quality respectively.

The type of the subject may also be classified by sex of a person, such as male and female. In this case, the plurality of image processing parameters stored in the parameter storage 1010 may be used to render the images of persons of the corresponding sexes (a woman or a man), into high image quality respectively. In addition, the type of the subject may be classified by the ages of a person. In this case, the plurality of image processing parameters stored in the parameter storage 1010 may be used to render the image of a teenager, the image of a person in his twenties, and so on, in high image quality respectively.

The attribute of a subject image is defined by the type of the subject, the plurality of states of the subject, and their combinations, as exemplified above. The parameter storage 1010 pre-stores, in association with the defined attributes, image processing parameters for rendering, into high image quality, the subject images belonging to the attributes. The plurality of image processing parameters stored in the parameter storage 1010 may be calculated according to a method similar to the method used in calculating the image processing parameters for respective facial orientations. For example, when the attribute is defined by a facial expression, an image processing parameter for generating a high quality image of a laughing face is calculated by performing pre-learning using a plurality of images containing a laughing face as a training image. Image processing parameters for generating high quality images of other facial expressions such as a face in anger can also be calculated by performing pre-learning in the similar manner. Image processing parameters can be also calculated for other attributes defined by gestures, postures, clothing, race, sex, and ages, in the similar manner.

The attribute identifying section 1020 may identify the attribute of a subject image, by adopting a classifier pre-calculated by boosting such as AdaBoost. For example, a classifier can be generated by integrating weak classifiers by boosting processing, using a plurality of facial images containing a face in a specified orientation as a teacher image. Based on the result of true/false obtained by adopting the subject image to the generated classifier, determination about whether it is a facial image of the specified facial orientation can be performed. For example, when the result of true is obtained, the inputted subject image can be determined to be the facial image of the specified facial orientation.

By generating classifiers for other facial orientations by boosting processing in the similar manner, classifiers can also be generated respectively for other facial orientations. The attribute identifying section 1020 adopts each of the generated classifiers, to identify the facial orientation based on the true/false result obtained for each classifier. Besides the facial orientation, the one or more other attributes defined by the facial expression and sex can also be identified by adopting classifiers generated to attributes by boosting processing respectively. The attribute identifying section 1020 can identify the attribute by adopting a classifier learned for each attribute using various methods such as linear discriminant, Gaussian mixture model, and so on, besides boosting.

Figure 13:
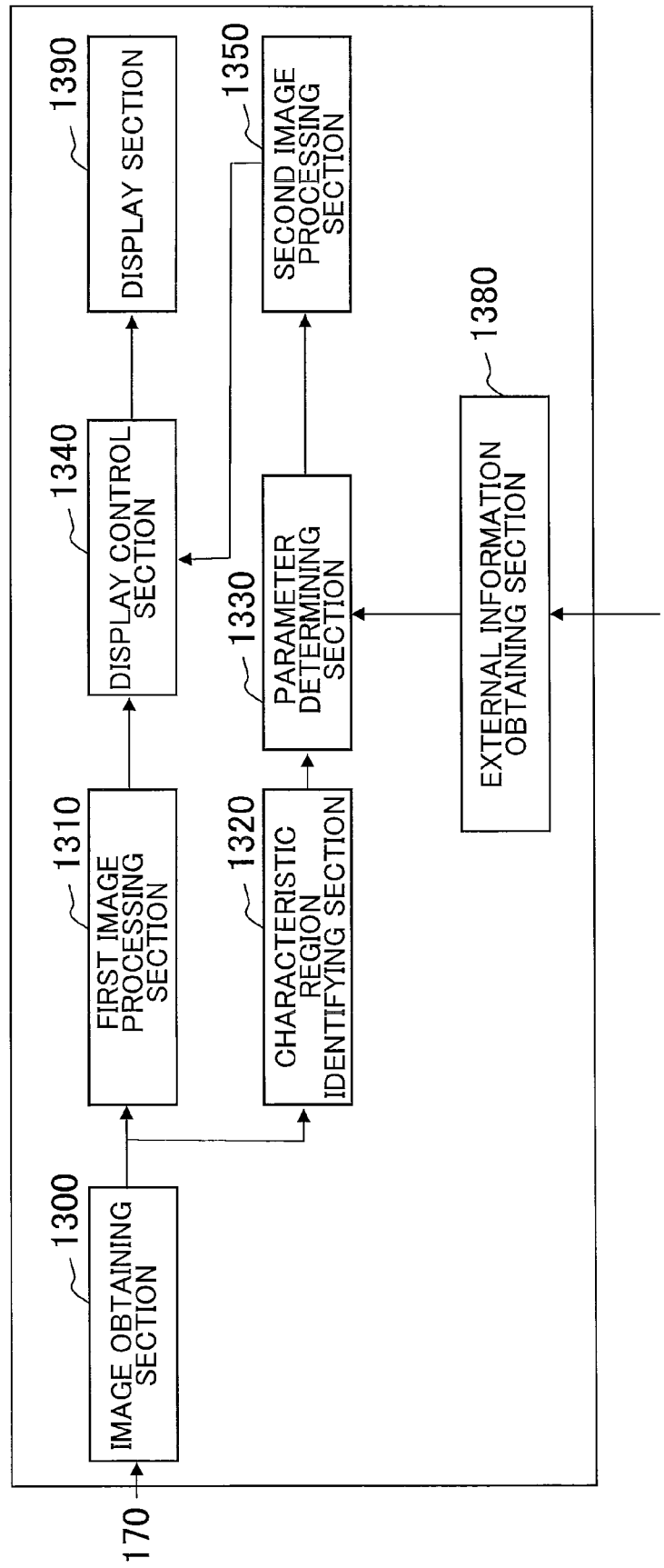
FIG. 13 shows an example of a block configuration of a display apparatus 180.

FIG. 13 shows an example of a block configuration of a display apparatus 180. The display apparatus 180 includes an image obtaining section 1300, a first image processing section 1310, a characteristic region identifying section 1320, a parameter determining section 1330, a display control section 1340, a second image processing section 1350, an external information obtaining section 1380, and a display section 1390.

The image obtaining section 1300 obtains an input image. Here, the input image may be a frame image contained in a moving image received from the image processing apparatus 170. The first image processing section 1310 generates a predetermined quality image in which the input image is rendered in higher image quality using a predetermined image processing parameter. For example, when generating a high resolution image, the first image processing section 1310 generates a predetermined quality image using an image processing parameter in a method (e.g., simple interpolation enlargement) by which the required operation amount is smaller than a predetermined value.

The display control section 1340 cause the display section 1390 to display the predetermined quality image generated by the first image processing section 1310. Accordingly, the display section 1390 displays the predetermined quality image.

The characteristic region identifying section 1320 identifies a plurality of characteristic regions in the input image. The characteristic region identifying section 1320 may identify the plurality of characteristic regions in the input image, in the state where the display section 1390 displays the predetermined quality image. Note that the image processing apparatus 170 may transmit, to the display apparatus 180, the moving image assigned, as the attachment information, the information for identifying characteristic regions. The characteristic region identifying section 1320 may identify the plurality of characteristic regions, by extracting the information for identifying the characteristic regions, from the attachment information of the moving image obtained by the image obtaining section 1300.

The parameter determining section 1330 determines, for each of the plurality of characteristic regions, image processing parameters for rendering images of the plurality of characteristic regions, in higher image quality. For example, the parameter determining section 1330 determines, for each of the plurality of characteristic regions, image processing parameters for rendering images of the plurality of characteristic regions, in different levels of higher image quality. For rendering "in different levels of higher image quality" indicates to render in high image quality in different operational amount, to render in high image quality in different operational amount for each unit area, and to render in high image quality in high image quality method required of different operational amount, for example.

The second image processing section 1350 generates a plurality of high quality images respectively of a plurality of characteristic regions, using the image processing parameter determined by the parameter determining section 1330. The display control section 1340 replaces the plurality of characteristic regions in the predetermined quality image under display by the display section 1390, with the plurality of high quality images. In this way, the display control section 1340 displays the high quality image upon generation thereof, instead of the predetermined quality image already in display by the display section 1390. By doing so, the display section 1390 can quickly generate the predetermined quality image and display it, so that users can observe a monitor image of a certain level of image quality without substantial delay.

The parameter determining section 1330 may determine the image processing parameters for each of the plurality of characteristic regions, based on the importance level of respective images of the plurality of characteristic regions. The information indicating importance level may be included in the attachment information. The importance level may be predetermined for each type of a subject in characteristic regions. The importance level of each type of a subject may be set by a user observing the display section 1390. The parameter determining section 1330 determines the image processing parameters for rendering, in higher level of image quality, characteristic regions having higher importance level. Accordingly, users can observe a more important characteristic region with higher image quality.

The parameter determining section 1330 determines the image processing parameter for each of the plurality of characteristic regions based on the type of the characteristic of respective images of the plurality of characteristic regions. The parameter determining section 1330 may determine the image processing parameter for each of the plurality of characteristic regions based on the type of a subject contained in the plurality of characteristic regions. In this way, the parameter determining section 1330 may directly determine the image processing parameter depending on the type of a subject.

For example, the parameter determining section 1330 determines an image processing parameter depending on the processing amount required to render in high image quality a plurality of characteristic regions in the second image processing section 1350. Specifically, the parameter determining section 1330 may determine an image processing parameter that yields higher level of image quality, when the required processing amount is smaller.

For example, the parameter determining section 1330 may determine the image processing parameter for rendering, in higher level of resolution, when the area of the plurality of characteristic regions is smaller. Then, the second image processing section 1350 generates a plurality of high quality images respectively of a plurality of characteristic regions, using the image processing parameter determined by the parameter determining section 1330. The parameter determining section 1330 may determine an image processing parameter for yielding a higher level of image quality when the pixel number of the plurality of characteristic regions is smaller.

The parameter determining section 1330 determines the image processing parameter based on a processable capacity allowed in the second image processing section 1350. Specifically, the parameter determining section 1330 may determine the image processing parameter for yielding a higher level of image quality when the processable capacity is smaller.

In this way, the level of high image quality processing can be controlled according to the operation amount processable by the second image processing section 1350. Therefore, it is possible to prevent the delay in image display due to overload of the display section 1390 attributable to high image quality processing. By allowing a space in the operation amount of the display section 1390, a high quality image can be quickly generated for observation by users.

As described above, an example of the high image quality processing is high resolution processing. Specifically, the parameter determining section 1330 determines, for each of a plurality of characteristic regions, the image processing parameter for rendering the image of the characteristic region in high resolution. The second image processing section 1350 generates a plurality of high quality images in which the images of a plurality of characteristic regions are rendered in high resolution, using the image processing parameters determined by the parameter determining section 1330. Here, rendering in higher level of resolution indicates to perform high resolution processing with high accuracy and to generate a high quality image of a more number of pixels.

The high image quality processing includes multiple tone processing. Specifically, the parameter determining section 1330 determines, for each of a plurality of characteristic regions, the image processing parameter for rendering the image of the characteristic region in multiple tones. The second image processing section 1350 generates a plurality of high quality images respectively resulting from performing multiple tone processing on the images of a plurality of characteristic regions, using the image processing parameter determined by the parameter determining section 1330.

The high image quality processing also includes multi-color processing. Specifically, the parameter determining section 1330 determines, for each of a plurality of characteristic regions, the image processing parameter for rendering the image of the characteristic region in multi-colors. The second image processing section 1350 generates a plurality of high quality images respectively resulting from performing multi-color processing on the images of a plurality of characteristic regions, using the image processing parameter determined by the parameter determining section 1330.

The high image quality processing also includes noise reduction, artifact reduction, blurring reduction, sharpness processing. For these various types of high image quality processing, too, the parameter determining section 1330 can determine the image processing parameter for yielding the various types of high image quality for each of a plurality of characteristic regions, so that the second image processing section 1350 can generate a plurality of high quality images resulting from rendering each of the plurality of characteristic regions in the various types of high image quality, using the image processing parameters determined by the parameter determining section 1330, just as in the case of the high resolution processing or the like.

As stated above, the image obtaining section 1300 may obtain a plurality of moving image constituting images contained in a moving image, as an input image. The parameter determining section 1330 determines, for each of a plurality of characteristic regions, the image processing parameter for rendering each of the plurality of characteristic regions in higher frame rate. Then, the second image processing section 1350 may generate the plurality of high quality images rendered in the higher frame rate, using the image processing parameters determined by the parameter determining section 1330.

The parameter determining section 1330 determines an image processing parameter based on the frame rate of a moving image. Specifically, the parameter determining section 1330 may determine the image processing parameter for yielding a higher level of image quality when the frame rate of the moving image is smaller. The second image processing section 1350 may generate a moving image of a high image quality, by rendering into high image quality the input image using the determined image processing parameters. Note that the high image quality processing performed by the second image processing section 1350 may include, just as the high image quality processing performed by the image processing apparatus 170, the concept of high resolution processing, multi-color processing, multiple tone processing, noise reduction, artifact reduction for reducing artifact such as block noise and mosquito noise, blurring reduction, and sharpness processing, high frame rate processing, wide dynamic range processing, reduction of folding components, tone correction, aberration correction, and conversion (e.g. encoding) and the second image processing section 1350 can generate a high quality image by these types of processing.

In this way, the display apparatus 180 can determine the level of high image quality processing, according to the data amount of images to be rendered in high image quality and the operation amount that can be assigned for the high image quality processing. The display apparatus 180 can quickly provide users with images of a certain level, and can prevent extreme delay in displaying high quality images. Therefore, the display apparatus 180 can prevent overload due to high image quality processing, enabling to smoothly play back the moving image provided from the image processing apparatus 170.

The external information obtaining section 1380 obtains, from outside of the display apparatus 180, the determining condition under which the image processing parameter is determined for each characteristic region. The parameter determining section 1330 determines the image processing parameters for each of a plurality of characteristic regions, based on the determining condition obtained by the external information obtaining section 1380. Examples of the determining condition include, as parameters, an importance level of a characteristic region, a type of characteristics of the characteristic region, a required amount of processing, an area of the characteristic region, the pixel number of the characteristic region, and processable capacity.

Figure 14:
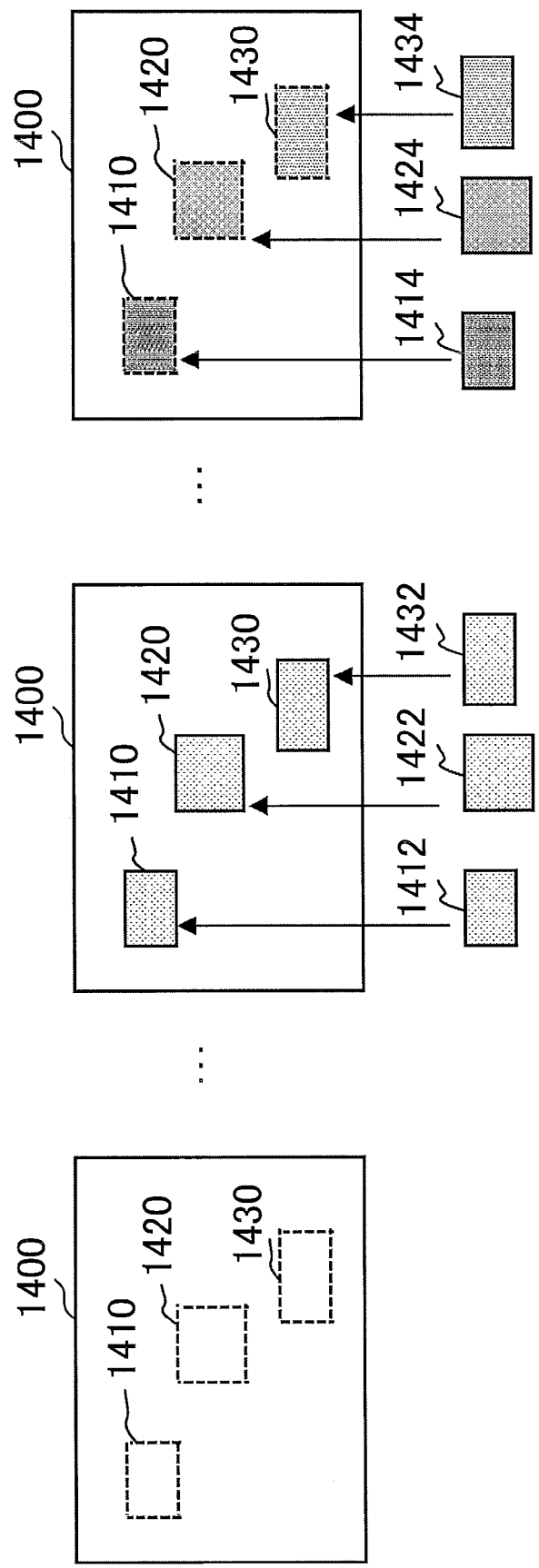
FIG. 14 shows an example of a display area 1400.

FIG. 14 shows an example of a display area 1400. The display area 1400 is assumed to be a region in which the input image is displayed by the display section 1390. Here, three characteristic regions are identified from the input image. The images of these characteristic regions are assumed to be displayed in the characteristic region area 1410, the characteristic region area 1420, and the characteristic region area 1430, within the display area 1400.

When the image obtaining section 1300 has obtained an input image, the display control section 1340 displays the obtained input image in the display area 1400 of the display section 1390 as it is.

While the input image is displayed, the second image processing section 1350 performs, on the image of each characteristic region, predetermined high resolution processing whose required amount of operation is smaller than a predetermined value such as a simple interpolation, to generate a predetermined quality image of each characteristic region (first high resolution step). In this first high resolution step, the level of high resolution does not depend on the data amount of image such as the number of pixels, the frame rate of the characteristic region, the importance level of the characteristic region, the type of the subject, and the operation amount allowed in the second image processing section 1350, so that the second image processing section 1350 performs a predetermined level of high resolution processing. Note that the operation amount required for performing the predetermined level of high resolution processing on the entire input image can be constantly assigned to the second image processing section 1350.

After the completion of the first high resolution step, and the predetermined quality image 1412 and the predetermined quality image 1432 are generated, the display control section 1340 displays the predetermined quality image 1412, the predetermined quality image 1422, and the predetermined quality image 1432, in the characteristic region area 1410, the characteristic region area 1420, and the characteristic region area 1430, respectively.

While displaying the predetermined quality image 1412, the predetermined quality image 1422, and the predetermined quality image 1432, the second image processing section 1350 performs high resolution processing at levels determined by the parameter determining section 1330 for each of characteristic regions, to generate high quality images of the characteristic regions (second high resolution step). In the second high resolution step, the level of high resolution is determined by the parameter determining section 1330, and depends on the data amount of image such as the number of pixels, the frame rate of the characteristic region, the importance level of the characteristic region, the type of the subject, and the operation amount allowed in the second image processing section 1350.

After the completion of the second high resolution step, and the high quality image 1414, the high quality image 1424, and the high quality image 1434 are generated, the display control section 1340 displays the high quality image 1414, the high quality image 1424, and the high quality image 1434, in the characteristic region area 1410, the characteristic region area 1420, and the characteristic region area 1430, respectively.

In this way, the second image processing section 1350 performs high resolution processing at a level corresponding to the current load amount and the operation amount required for high image quality processing. Therefore, a high quality image can be provided for a user quickly as possible.

Figure 15:
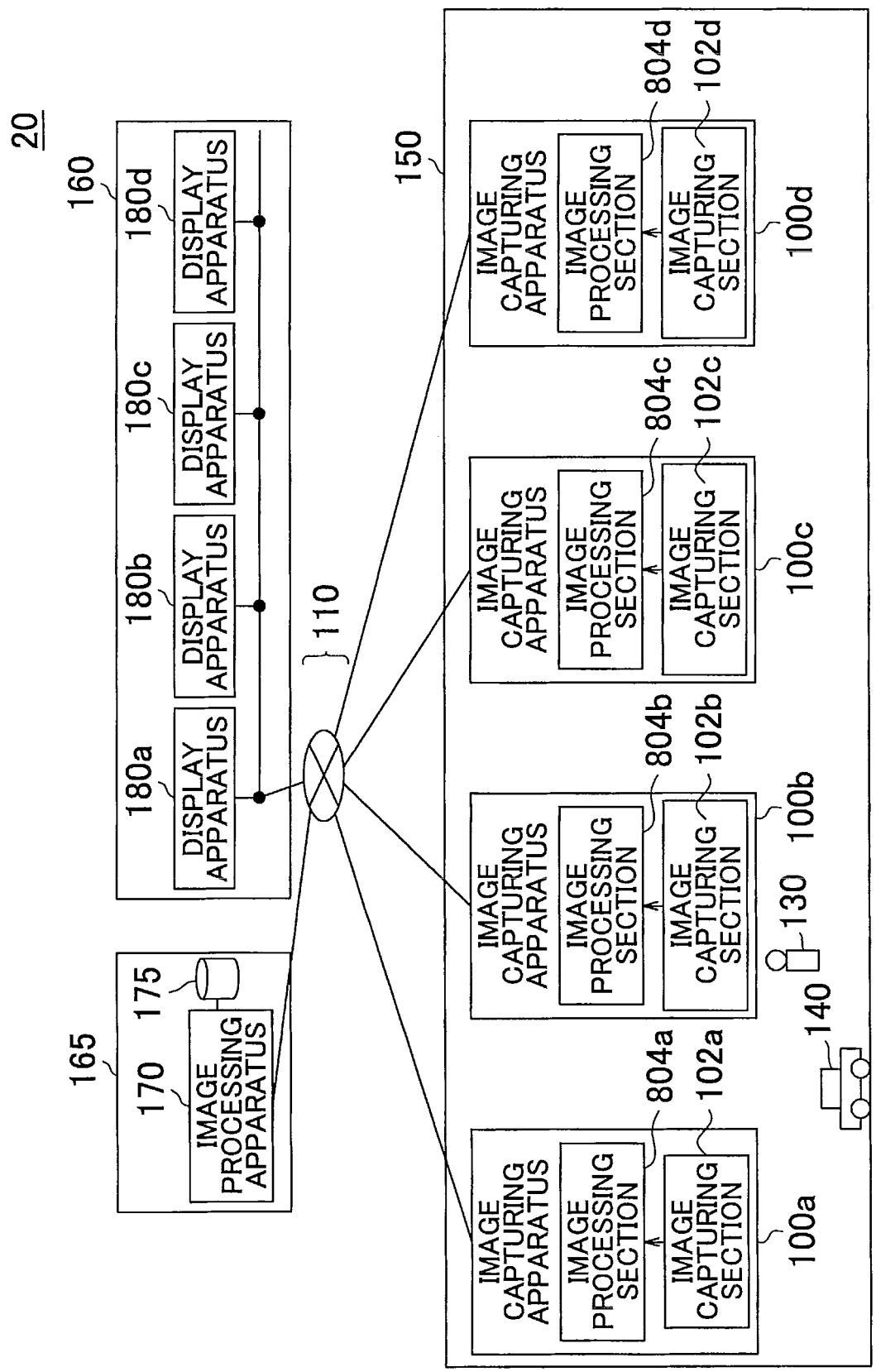
FIG. 15 shows an example of an image processing system 20 according to another embodiment.

FIG. 15 shows an example of an image processing system 20 according to another embodiment. The configuration of the image processing system 20 according to the present embodiment is the same as the configuration of the image processing system 10 explained with reference to FIG. 1, except that the image capturing apparatuses 100*a-d* include the image processing sections 804*a-d* respectively (hereinafter collectively referred to as "image processing section 804").

The image processing section 804 includes all the constituting elements of the image processing apparatus 120, except for the image obtaining section 250. The function and operation of each constituting element of the image processing section 804 is the same as the function and operation of each constituting element of the image processing apparatus 120, except that it processes the moving image captured by the image capturing section 102, in contrast to the each constituting element of the image processing apparatus 120 processing the moving image obtained by expansion by the compressed moving image expanding section 202. The image processing system 20 having the stated configuration can achieve the effect similar to the effect explained with reference to the image processing system 10 from FIG. 1 through FIG. 14.

The image processing section 804 may obtain a moving image containing a plurality of captured images represented in RAW format from the image capturing section 102, and compress the captured images in RAW format included in the obtained moving image. Note that the image processing section 804 may detect one or more characteristic regions from a plurality of captured images represented in RAW format. In addition, the image processing section 804 may compress the moving image containing a plurality of captured image in compressed RAW format. The image processing section 804 can compress the moving image, by a compression method explained as the operation of the image processing apparatus 120 with reference to FIG. 1 through FIG. 9. The image processing apparatus 170 can also obtain a plurality of captured images represented in RAW format, by expanding the moving image obtained from the image processing section 804. The image processing apparatus 170 expands the plurality of captured images represented in the RAW format obtained by expansion, for each region, and performs concurrent processing to each region. The image processing apparatus 170 may perform concurrent processing in higher accuracy in the characteristic region than in the region outside the characteristic region.

Note that the image processing apparatus 170 may perform super-resolution processing on the image of the characteristic region in the captured image obtained by the concurrent processing. The super-resolution processing performed by the image processing apparatus 170 may include super-resolution processing based on principal component analysis as disclosed in Japanese Patent Application Publication No. 2006-350498 and super-resolution processing based on the motion of a subject as disclosed in Japanese Patent Application Publication No. 2004-88615. Note that the super-resolution processing disclosed in Japanese Patent Application Publication No. 2004-88615 may be realized by a general parameter that is an image processing parameter usable regardless of the object.

The image processing apparatus 170 may perform super-resolution processing for each object included in the characteristic region. For example, when the characteristic region includes a facial image of a person, the image processing apparatus 170 performs super-resolution processing for each part of the face (e.g., for eyes, nose, and mouth), which is one example of the object. In this case, the image processing apparatus 170 stores learning data for such a model as disclosed in Japanese Patent Application Publication No. 2006-350498, for each part of the face (e.g., for eyes, nose, and mouth). Then, the image processing apparatus 170 may perform super-resolution processing on the image of each part of the face, using the learning data selected for each part of the face included in the characteristic region.

Note that the learning data such as a model may be stored for each combination of a plurality of facial expressions, a plurality of facial orientations, and a plurality of illumination conditions. The facial expression includes a face of a person in joy, anger, sorrow, and pleasure, and straight face, or the like, and the facial orientation includes front, upper, lower, right, left, and rear. The illumination condition includes an illumination intensity and an illumination direction. The image processing apparatus 170 may perform super-resolution processing on the facial image using learning data corresponding to the combination of the facial expression, the facial orientation, and the illumination condition.

Note that the facial expression and the facial orientation can be identified based on the image contents of the facial image included in the characteristic region. In addition, the facial expression can be identified from the form of the mouth and/or the eyes, and the facial orientation can be identified from the positional relation between the eyes, the mouth, the nose, and the eyes. In addition, the illumination intensity and the illumination direction can be determined based on the image contents of the facial image, including the position and size of the shadow. Note that the facial expression, the facial orientation, and the illumination condition may be identified by the image processing apparatus 120, and the facial expression, the facial orientation, and the illumination condition can be transmitted from the output section 207, in association with the image. The image processing section 170 may perform super-resolution processing using the learning data corresponding to the facial expression, the facial orientation, and the illumination condition received from the output section 207.

Note that the model of each part of a face can be used as a model of learning data, not limited to the model expressing the entire face. The model of a face of a person according to each sex and/or each race can also be used. The model is not limited to a human being, and can be a model of each type of object to be monitored (e.g., vehicles and ships).

In this way, the image processing apparatus 170 can reconstruct the image of a characteristic region using a principal component analysis (PCA). Note that examples of the image reconstruction method by means of the image processing apparatus 170 and the learning method thereof include, other than the learning and image reconstruction by means of principal component analysis (PCA), locality preserving projection (LPP), linear discriminant analysis (LDA), independent component analysis (ICA), multidimiensional scaling (MDS), support vector machine (SVM) (support vector regression), neutral network, Hidden Markov Model (HMM), Bayes estimator, Maximum a posteriori, Iterative Back Projection Method, Wavelet Conversion, locally linear embedding (LLE), Markov random field (MRF), and the like.

The learning data may include, other than the model described in Japanese Patent Application Publication No. 2006-350498, a low frequency component and a high frequency component of the image of the object respectively extracted from a multiple sample images of the object. Here, for each type of the plurality of objects, the low frequency component of the image of the object can be clustered into a plurality of clusters, by means of K-means or the like. In addition, a representative low frequency component (e.g., barycenter value) can be determined for each cluster.

The image processing apparatus 170 extracts the low frequency component from the image of the object included in the characteristic region in the captured image. The image processing apparatus 170 identifies the cluster whose value matching the extracted low frequency component is determined as the representative low frequency component. The image processing apparatus 170 identifies the cluster of the high frequency component associated with the low frequency component included in the identified cluster. In this way, the image processing apparatus 170 can identify the cluster of the high frequency component related to the low frequency component extracted from the object included in the captured image. The image processing apparatus 170 can convert the image of the object into higher image quality, using a high frequency component representative of the identified cluster of high frequency component. For example, the image processing apparatus 170 may add, to the image of the object, the high frequency component selected for each object with a weight corresponding to the distance up to the processing target position on the face from the center of each object. Here, the representative high frequency component may be generated by closed-loop learning. In this way, the image processing apparatus 170 can sometimes render the image of the object into high image quality with higher accuracy, since it selects desirable learning data from among the learning data generated by performing learning according to each object.

Note that the image processing apparatus 170 may not use K-means clustering or the like, but instead may use the low frequency component and the high frequency component in storage, to render the input image into high image quality. For example, the image processing apparatus 170 stores, in advance, a pair of (a) the low resolution edge component that is an edge component extracted from each patch of a low resolution training image, and (b) the high resolution edge component that is an edge component extracted from each patch of a high resolution training image. These edge components may be stored as a vector on the characteristic space such as PCA.

In rendering the input image to high image quality, the image processing apparatus 170 extracts the edge component for each patch, from the enlarged image obtained by enlarging the input image using a predetermined method such as a bi-cubic convolution technique. The image processing apparatus 170 calculates the norm between the extracted edge component and the stored edge component, on the characteristic space such as PCA. The image processing apparatus 170 selects a plurality of patches whose norm is calculated as smaller than a predetermined value, from among the patches in storage. The image processing apparatus 170 sets a Markov random field of the extracted edge component and the high resolution edge component of the selected plurality of patches, for the targeted patch and its peripheral patches. The image processing apparatus 170 solves the energy minimizing problem of the Markov random field model set for each targeted parch, using a Loopy Blief Propagation (LBP) or the like, to select the high resolution edge component to be added to the image in each targeted patch from the high resolution edge component in storage. The image processing apparatus 170 generates a high quality image, by adding each selected high resolution edge component to the image component of the corresponding patch of the enlarged image.

The image processing apparatus 170 may also use a plurality of classes of Gaussian mixture models, to render the input image into high image quality. For example, the image vector of each patch in a low resolution training image and the image vector of each patch in a high resolution training image are used as learning data. The mean and variance of the density distribution corresponding to each class of the Gaussian mixture model and the weight to each class are calculated by using a cluster vector obtained from the image vector of each patch in the low resolution training image and by EM algorithm or the like. The image processing apparatus 170 stores these mean, variance, and weight as learning data. In rendering the input image to high image quality, the image processing apparatus 170 generates a high quality image by using the image vector of each patch in the input image, the cluster vector obtained from the image vector, the mean, variance, and weight stored as the learning data.

The image processing apparatus 170 may also use outline information extracted from the input image, to generate the high quality image solely from the input image. For example, in a case such as rendering, into high resolution, a specific image region in the vicinity of the outline extracted from the input image, the image processing apparatus 170 places, in a specific image region, the pixel value of the pixels included in the other regions along the outline, to generate a high quality image in which the specific image region is rendered in high resolution. For example, the image processing apparatus 170 may render a specific image region into high resolution, by determining in which position of the specific image region the pixel value of the pixel is to be placed, based on the positional relation between the position of the pixel included in the other region and the position of the outline, and placing the pixel value in the determined position.

Note that the image processing apparatus 170 may perform the high resolution processing using the above-explained outline information, only to the vicinity of the edge region including the edge in the input image. A filtering method or the like may be used to the image region other than the edge region. For example, the image processing apparatus 170 may use the filtering method in rendering into high resolution a flat region whose extracted edge amount is smaller than or equal to a predetermined amount. The image processing apparatus 170 may render, into high resolution, the texture region whose extracted edge amount is larger than the predetermined amount, by correcting the image rendered in high resolution using the filtering method, to satisfy the condition generated from the input image.

As noted above, the high image quality processing using the low frequency component and the high frequency component, the Gaussian mixture model, and the high resolution processing using outline information may be used for rendering into high image quality the image to which no object is specified. The parameter storage 1010 may store the parameter used for the high image quality processing by the image processing apparatus 170 (e.g., the high frequency component data corresponding to the low frequency component, the filter for rendering a flat region into high resolution, and the learning data relating to the Gaussian mixture mode). Examples of the processing to render into high image quality the image to which an object is specified are high image quality processing using the tensor and the high image quality processing using the locality preserving projection, described below.

The following explains the high image quality processing using the tensor, taking an example of the high image quality processing directed to a facial image. Facial images having different resolution, person, and patch position from each other are used as learning images, to calculate the four dimensional tensor having, as learning targets, the resolution, the patch position, the individual, and the pixel. These learning images are used to calculate eigenvectors in the characteristic space, respectively directed to the resolution, the patch position, the person, and the pixel value. The four dimensional tensor by the product of the calculated eigenvectors is used to generate a middle resolution facial image, from the facial image included in the input image. Note that an eigenvector can be calculated by learning by means of singular value decomposition, locality preserving projection (LPP), and the like. Note that a high resolution patch used to recover the high frequency component from the middle resolution facial image is obtained from the high resolution learning image. The image processing apparatus 170 stores the tensor and the high resolution patch, having been obtained.

In rendering in high image quality the facial image included in the input image, the image processing apparatus 170 converts the facial image by the four dimensional tensor in storage, in the unit of patches, to obtain a patch for forming a middle resolution facial image. Then, the image processing apparatus 170 sets the Markov random field between the middle resolution patch and the high resolution patch in storage. A high resolution facial image in which the high frequency component is recovered can be obtained by solving the energy minimizing problem of the total patch of the Markov random field model using iterated conditional mode (ICM) or the like.

The image processing apparatus 170 may generate a low resolution facial image from the facial image included in the input image, as a pre-processing before obtaining the middle resolution patch. In this case, the image processing apparatus 170 obtains the middle resolution patch by converting the low resolution facial image obtained by the pre-processing, by the above-described four dimensional tensor. In the pre-processing, a five dimensional tensor obtained by having, as targets, the facial orientation, the illumination level, the facial expression, the person, and the pixel may be used to convert the facial image included in the input image. The learning images used to obtain the five dimensional tensor may be facial images having different facial orientation, illumination level, facial expression, and person, from each other.

The pre-processing preferably includes alignment processing of the facial images included in the input image. For example, the facial images can be aligned by affine transformation. To be more specific, and the positions between the facial image after the affine transformation and the facial image for learning are aligned, by optimizing the affine transformation parameter. The facial images for learning are also preferably subjected to the alignment processing to align the mutual positions.

An example of high image quality processing using locality preserving projection (LPP) is described below. In the learning step, an eigenvector is calculated from each of the low resolution image and the high resolution image as learning images, by means of locality preserving projection (LPP). In the LPP space, the low resolution image and the high resolution image are associated with each other, as a weight of the network by means of radial basis function. In addition, calculated are: the residual image between the middle resolution image obtained using the low resolution image as a learning image and the low resolution image; and the residual image between the high resolution image being a learning image and the middle resolution image. The image processing apparatus 170 stores the residual image between the middle resolution image and the low resolution image, as well as the residual image between the high resolution image and the middle resolution image, for each patch.

In rendering an input image into high image quality, the image processing apparatus 170 generates a middle resolution image, using the eigenvector obtained from the input image by means of locality preserving projection (LPP), as well as the radial basis function obtained in the learning step. The image processing apparatus 170 calculates the residual image between the middle resolution image and the input facial image. Then, based on the residual image, the corresponding residual image between the high resolution image and the low resolution image is selected from the stored residual images, for each patch, using LLE (Locally Linear Embedding) and nearest neighbor search. Then, the image processing apparatus 170 generates a high quality image, by adding, to the middle resolution image generated from the input image, the residual image obtained by smoothing the selected residual image.

An image of an object is represented by a principal component vector and a weight factor, in the super-resolution processing based on the principal component analysis as described in Japanese Patent Application Publication No. 2006-350498. The data amount of these weight factor and principal component vector is substantially smaller than the data amount of the pixel data included in the image of the object itself. With this in view, the image processing section 804 can calculate the weight factor from the image of the object included in the characteristic region, in compression of the image of the characteristic region in the plurality of captured images obtained from the image capturing section 102. That is, the image processing section 804 can compress the image of the object included in the characteristic region, by representing the image by the principal component vector and the weight factor. The image processing section 804 then can transmit the principal vector and the weight factor to the image processing apparatus 170. The image processing apparatus 170 can use the principal component vector and the weight factor obtained from the image processing section 804, to reconstruct the image of the object included in the characteristic region. Here, needless to say, the image processing section 804 can compress the image of the object included in the characteristic region, by using the model representing the object using various characteristic parameters, other than the model based on the principal component analysis as described in Japanese Patent Application Publication No. 2006-350498.

Note that also in the configuration of the image processing system 10 described above with reference to FIG. 1 through FIG. 14, the image processing apparatus 170 or the display apparatus 180 can still perform the above-described super-resolution processing on the image of the characteristic region, as high image quality processing. In addition, in the image processing system 10 and the image processing system 20, the compression section 240 can represent the image by the principal component vector and the weight factor, just as the above-described image processing apparatus 120, to further compress the captured image.

So far, the operation of the image processing system 10 has been described by way of a monitoring system. The present invention can also be applied to high image quality processing and encoding directed to the documents scanned by scanner appliances such as copiers. For example, each region of the text, the drawing, the table, and the photograph can be regarded as a characteristic region, and the high image quality processing such as the above-described super-resolution processing can be applied as high resolution processing targeted on these regions. The above-described characteristic region detection and compression can also be applied to the detection and encoding of these characteristic regions. Likewise, the above-described characteristic region detection, the high image quality processing, and the compression can also be applied to an endoscope system, in detection, high image quality processing, and encoding of parts within a body.

Although some aspects of the present invention have been described by way of exemplary embodiments, it should be understood that those skilled in the art might make many changes and substitutions without departing from the spirit and the scope of the present invention which is defined only by the appended claims.

The operations, the processes, the steps, or the like in the apparatus, the system, the program, and the method described in the claims, the specification, and the drawings are not necessarily performed in the described order. The operations, the processes, the steps, or the like can be performed in an arbitrary order, unless the output of the former-described processing is used in the later processing. Even when expressions such as "First," or "Next," or the like are used to explain the operational flow in the claims, the specification, or the drawings, they are intended to facilitate the understanding of the invention, and are never intended to show that the described order is mandatory.

As clear from the above description, according to the embodiment(s) of the present invention, an image processing apparatus, an image processing method, and a computer readable medium that can sole the above-described problems can be realized.

What is claimed is:
1. An image processing apparatus comprising:
a parameter storage that stores, in association with a plurality of attributes, a plurality of image processing parameters for respectively rendering subject images of different attributes from each other, into high image quality; and
an image generating section that generates a high quality image of a subject image included in an input image, using the plurality of image processing parameters stored in the parameter storage, wherein the parameter storage stores the plurality of image processing parameters in association with the plurality of attributes, each attribute indicating a state of a subject captured as a subject image, and wherein the image generating section selects at least one image from high quality images of the subject image included in the input image using respectively different combinations of the plurality of image processing parameters selected, based on attributes of the subject specified from the input image and based on comparison with the input image, and generates the selected image as the high quality image.

2. The image processing apparatus according to claim 1, wherein the image generating section selects at least one image from high quality images of the subject image included in the input image using respectively different combinations of the plurality of image processing parameters, based on comparison with the input image, and generates the selected image as the high quality image.

3. The image processing apparatus according to claim 1, further comprising:

an attribute identifying section that identifies an attribute of the subject image included in the input image; and a parameter selecting section that selects image processing parameters from the parameter storage, starting from those associated with attributes that more match the attribute identified by the attribute identifying section, wherein the image generating section generates a high quality image of the subject image included in the input image, using the image processing parameters selected by the parameter selecting section.

4. The image processing apparatus according to claim 3, further comprising:

a weight determining section that determines weights to the plurality of image processing parameters used in rendering the subject image included in the input image into high image quality, wherein the image generating section generates a high quality image of the input image, using the image processing parameters selected by the parameter selecting section, based on the weights determined by the weight determining section.

5. The image processing apparatus according to claim 4, wherein the weight determining section determines, to be larger, a weight for an image processing parameter associated with an attribute whose matching level with respect to the identified attribute is larger.

6. The image processing apparatus according to claim 3, wherein each of the plurality of attributes represents a state of a subject.

7. The image processing apparatus according to claim 6, wherein each of the plurality of attributes represents an orientation of a subject.

8. The image processing apparatus according to claim 7, wherein each of the plurality of attributes represents a facial orientation of a person.

9. The image processing apparatus according to claim 6, wherein each of the plurality of attributes represents a facial expression of a person.

10. The image processing apparatus according to claim 6, wherein each of the plurality of attributes represents a gesture of a person.

11. The image processing apparatus according to claim 6, wherein each of the plurality of attributes represents a posture of a person.

12. The image processing apparatus according to claim 6, wherein each of the plurality of attributes represents clothing of a person.

13. The image processing apparatus according to claim 3, wherein each of the plurality of attributes represents a type of a subject.

14. The image processing apparatus according to claim 13, wherein each of the plurality of attributes represents at least one of sex, age, and race of a person.

15. The image processing apparatus according to claim 3, further comprising:

a parameter generating section that generates a combination parameter being a combination among the plurality of image processing parameters selected by the parameter selecting section, wherein the image generating section generates the high quality image of the subject image included in the input image, using the combination parameter generated by the parameter generating section.

16. The image processing apparatus according to claim 1, wherein the parameter storage stores, as the plurality of image processing parameters for respectively rendering subject images of different attributes from each other, into high image quality, at least one of a plurality of image processing parameters for rendering the subject images into high resolution, a plurality of image processing parameters for increasing a number of tones of a pixel value of the subject images, a plurality of image processing parameters for increasing a number of colors of a pixel value of the subject images, a plurality of image processing parameters for reducing noise of the subject images, a plurality of image processing parameters for reducing artifact of the subject images, a plurality of image processing parameters for reducing blurring of the subject images, and a plurality of image processing parameters for performing sharpness processing on the subject images.

17. The image processing apparatus according to claim 1, wherein the parameter storage stores the plurality of image processing parameters for rendering subject images included in a moving image in high frame rate.

18. The image processing apparatus according to claim 1, further comprising:

an external information obtaining section that obtains, from outside, the plurality of image processing parameters stored in the parameter storage, wherein the parameter storage stores the plurality of image processing parameters obtained by the external information obtaining section.

19. The image processing apparatus according to claim 1, wherein the parameter storage stores the plurality of image processing parameters in association with the plurality of attributes, each attribute indicating an orientation of the subject captured as the subject image.

20. The image processing apparatus according to claim 1, wherein the parameter storage stores the plurality of image processing parameters in association with the plurality of attributes, each attribute indicating a facial expression of a person captured as the subject image.

21. The image processing apparatus according to claim 1, wherein the parameter storage stores the plurality of image processing parameters in association with the plurality of attributes, each attribute indicating a gesture of a person captured as the subject image.

22. The image processing apparatus according to claim 1, wherein the parameter storage stores the plurality of image processing parameters in association with the plurality of attributes, each attribute indicating a posture of a person captured as the subject image.

23. The image processing apparatus according to claim 1, wherein the parameter storage stores the plurality of image processing parameters in association with the plurality of attributes, each attribute indicating a clothing of a person captured as the subject image.

24. The image processing apparatus according to claim 1, wherein the image processing apparatus further comprises an attribute identifying section that identifies an attribute of the subject image included in the input image.

25. The image processing apparatus according to claim 24, wherein the image processing apparatus further comprises a parameter selecting section that selects image processing parameters from the parameter storage, starting from those associated with attributes that better match the attribute identified by the attribute identifying section, and a parameter generating section that generates a combination parameter that is a combination between the plurality of image processing parameters selected by the parameter selecting section.

26. The image processing apparatus according to claim 1, wherein the parameter storage stores an object-specific parameter calculated by learning using a plurality of images of a predetermined object as a training image, and a general parameter calculated by learning using a plurality of images that are not about a predetermined object, as a training image.

27. An image processing method comprising:
storing, in association with a plurality of attributes, a plurality of image processing parameters for respectively rendering subject images of different attributes from each other, into high image quality; and
generating a high quality image of a subject image included in an input image, using the plurality of stored image processing parameters,
wherein the storing stores the plurality of image processing parameters in association with the plurality of attributes, each attribute indicating a state of a subject captured as a subject image, and
wherein the image generating selects at least one image from high quality images of the subject image included in the input image using respectively different combinations of the plurality of image processing parameters selected, based on attributes of the subject specified from the input image and based on comparison with the input, and generates the selected image as the high quality image.

28. A non-transitory computer readable medium for storing a program for an image processing apparatus, the program causing a computer to function as:
a parameter storage that stores, in association with a plurality of attributes, a plurality of image processing parameters for respectively rendering subject images of different attributes from each other, into high image quality; and
an image generating section that generates a high quality image of a subject image included in an input image, using the plurality of image processing parameters stored in the parameter storage,
wherein the parameter storage stores the plurality of image processing parameters in association with the plurality of attributes, each attribute indicating a state of a subject captured as a subject image, and
wherein the image generating section selects at least one image from high quality images of the subject image included in the input image using respectively different combinations of the plurality of image processing parameters selected, based on attributes of the subject specified from the input image and based on comparison with the input, and generates the selected image as the high quality image.

* * * * *